(12) United States Patent
Aggarwal et al.

(10) Patent No.: US 8,014,395 B1
(45) Date of Patent: Sep. 6, 2011

(54) METHOD AND APPARATUS FOR PROCESSING LABELS

(75) Inventors: Rahul Aggarwal, Menlo Park, CA (US); Pedro Miguel Martins Roque Marques, San Jose, CA (US)

(73) Assignee: Ericsson AB, Stockholm (SE)

( * ) Notice: Subject to any disclaimer, the term of this patent is extended or adjusted under 35 U.S.C. 154(b) by 1480 days.

(21) Appl. No.: 10/103,207

(22) Filed: Mar. 21, 2002

Related U.S. Application Data

(60) Provisional application No. 60/347,365, filed on Jan. 10, 2002.

(51) Int. Cl.
*H04L 12/28* (2006.01)
(52) U.S. Cl. .......................................... 370/392; 370/400
(58) Field of Classification Search .................. 370/389, 370/392, 401–403
See application file for complete search history.

(56) References Cited

U.S. PATENT DOCUMENTS

| | | | |
|---|---|---|---|
| 5,546,387 A | 8/1996 | Larsson et al. | |
| 6,331,078 B1 | 12/2001 | Van Duyn | |
| 6,331,978 B1 | 12/2001 | Ravikanth | |
| 6,697,361 B2* | 2/2004 | Fredette et al. | 370/389 |
| 6,816,454 B1* | 11/2004 | Mallath et al. | 370/216 |
| 7,136,374 B1* | 11/2006 | Kompella | 370/352 |
| 7,463,639 B1* | 12/2008 | Rekhter | 370/409 |
| 2002/0071390 A1* | 6/2002 | Reeves et al. | 370/235 |
| 2002/0071439 A1 | 6/2002 | Reeves et al. | |
| 2002/0080794 A1* | 6/2002 | Reeves et al. | 370/395.2 |
| 2002/0118682 A1* | 8/2002 | Choe | 370/395.31 |
| 2002/0172155 A1* | 11/2002 | Kasvand-Harris et al. | 370/229 |
| 2004/0258073 A1* | 12/2004 | Alexander et al. | 370/395.5 |

OTHER PUBLICATIONS

Awduche, D., et al., "RSVP-TE: Extensions to RSVP for LSP Tunnels", Network Working Group Request for Comments: 3209, Dec. 2001, 55 pages.
Berger, L., et al., "RSVP Extensions for IPSEC Data Flows", Network Working Group Request for Comments: 2207, Sep. 1997, 13 pages.
Braden, R., et al., "Resource ReSerVation Protocol (RSVP)—Version 1 Functional Specification", Network Working Group Request for Comments: 2205, Sep. 1997, 100 pages.
Braden, R., et al., "Resource ReSerVation Protocol (RSVP)—Version 1 Message Processing Rules", Network Working Group Request for Comments: 2209, Sep. 1997, 23 pages.
Moy, J., "Hitless OSPF Restart—draft-ietf-ospf-hitless-restart-02.txt", Network Working Group Internet Draft, http://search.ietf.org/internet-drafts/draft-ietf-ospf-hitless-restart-02.txt, Feb. 2002, 13 pages.

(Continued)

*Primary Examiner* — Jung Park

(74) *Attorney, Agent, or Firm* — Blakely Sokoloff Taylor & Zafman, LLP

(57) ABSTRACT

Methods and apparatus for processing labels is described. An exemplary method includes allocating labels at a network device in accordance with a set of one or more ranges, and reflecting, in the set of ranges, labels allocated for label switching with peers of the network device. According to an embodiment, the labels and the set of ranges are within a sub-space of a logically partitioned label space, the sub-space being designated to a client.

56 Claims, 26 Drawing Sheets

OTHER PUBLICATIONS

Rosen, E., et al., "Multiprotocol Label Switching Architecture", Network Working Group Request for Comments: 3031, Jan. 2001, 55 pages.

Sangli, S. R., et al., "Graceful Restart Mechanism for BGP—draft-ietf-idr-restart-05.txt", Network Working Group Internet Draft, http://search.ietf.org/internet-drafts/draft-ietf-idr-restart-05.txt, Jun. 2002, 10 pages.

Zinin, A., et al., "OSPF Restart Signaling—draft-nguyen-ospf-restart-00.txt", Network Working Group Internet Draft, http://search.ietf.org/internet-drafts/draft-nguyen-ospf-restart-00.txt, Mar. 2002, 4 pages.

Andersson, L., et al., "LDP Specification," Network Working Group Request for Comments: 3036, Jan. 2001.

Awduche, D., et al., "Requirements for Traffic Engineering Over MPLS," Network Working Group Request for Comments: 2702, Sep. 1999.

Davie, B, et al., "MPLS Using LDP and ATM VC Switching," Network Working Group Request for Comments: 3035, Jan. 2001.

Andersson, L., et al., "LDP Specification", [online] [retrieved Nov. 11, 2007] Retrieved from http://www.ietf.org/rfc/rfc3036.txt, The Internet Society. RFC 3036, Jan. 2001.

\* cited by examiner

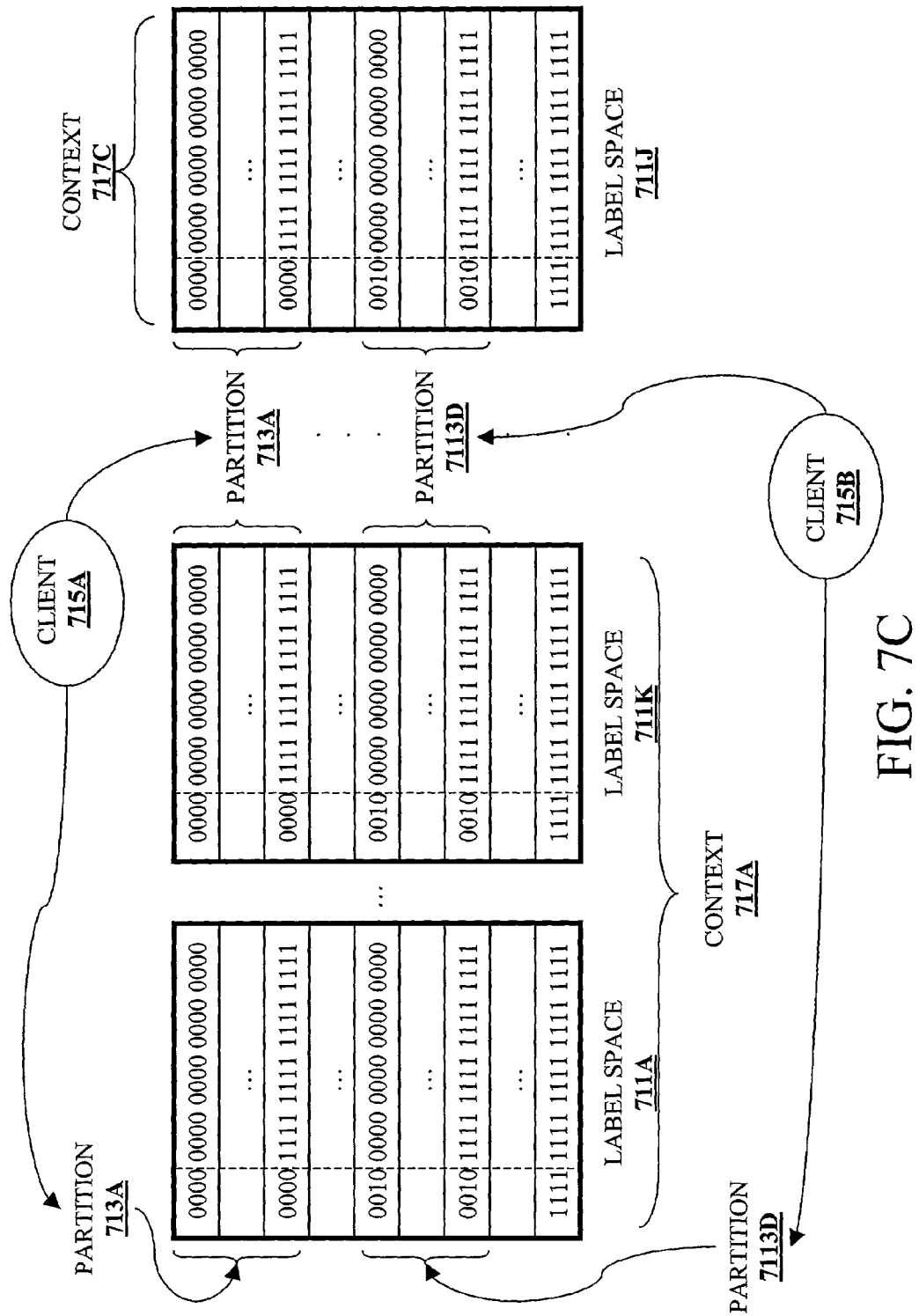

| FORWARDING INFORMATION 1503 | LABEL SWITCHED PATH IDENTIFIER 1505 | FORWARDING FEATURES 1507 | LABEL IDENTIFIER 1509 |

LEAF 1501

FIG. 15

METHOD AND APPARATUS FOR PROCESSING LABELS

CROSS-REFERENCE TO RELATED APPLICATIONS

This application claims the benefit of U.S. Provisional Patent Application No. 60/347,365, entitled "Method and Apparatus for Processing Label Identifiers" filed on Jan. 10, 2002.

BACKGROUND OF THE INVENTION

1. Field of the Invention

The invention relates to the field of communication. More specifically, the invention relates to communication networks.

2. Background of the Invention

The multi-protocol label switching (MPLS) protocol may be categorized as a network layer protocol of the Open Standards Institute (OSI) reference model. MPLS provides a method for generically tunneling data through networks with label switched paths (LSPs). Traffic travels along an LSP with label stacks.

FIG. 1 (Prior Art) is a diagram of a label stack entry according to multi-protocol label switching (MPLS). A label stack entry 100 is a 32-bit value that includes the following fields: a label identifier field 101, a stack bit field 103, an experimental field 105, and a time to live field (TTL)107. The label identifier field 101 includes a 20-bit label identifier for a label switched path (LSP). The stack bit field 103 includes a single bit to indicate whether the label stack entry 100 is the last label stack entry of a packet. The experimental field 105 includes 3 bits reserved for experimental purposes. The time to live field 107 includes 8 bits to indicate the number of hops a label stack entry should exist.

Typically, a client (e.g., a signaling protocol module) requests a label identifier. A centralized process allocates a label identifier from a label space by traversing an array of label identifiers previously allocated from the label space. Once the allocated label identifiers are determined, a free label identifier is allocated. Traversing such an array of previously allocated labels is inefficient. As the number of allocated labels increases, label allocation performance deteriorates. In addition, allocating labels from a centralized array of label identifiers for a label space, prevents continued forwarding of packets along an LSP of a signaling protocol module that has restarted.

BRIEF SUMMARY OF THE INVENTION

A method and apparatus for processing labels is described. According to one aspect of the invention, a method in a network device provides for allocating labels in accordance with a set of one or more ranges, and reflecting, in said set of ranges, labels allocated for label switching with peers of said network device.

These and other aspects of the present invention will be better described with reference to the Detailed Description and the accompanying Figures.

BRIEF DESCRIPTION OF THE DRAWINGS

The invention may best be understood by referring to the following description and accompanying drawings that are used to illustrate embodiments of the invention. In the drawings:

FIG. 7C is a conceptual diagram illustrating exemplary contexts with partitioned label spaces according to one embodiment of the invention.

FIG. 15 is an exemplary diagram illustrating a leaf according one embodiment of the invention.

DETAILED DESCRIPTION OF THE INVENTION

In the following description, numerous specific details are set forth to provide a thorough understanding of the invention.

However, it is understood that the invention may be practiced without these specific details. In other instances, well-known circuits, structures, standards, and techniques have not been shown in detail in order not to obscure the invention. Throughout the description, the term "label" is used to refer to a value used for label switching through a network, typically attached to a packet.

In one embodiment, request ranges of acceptable labels are requested for label switched paths (LSPs) and allocated from a label space. In another embodiment, label requests, which may indicate ranges of labels, are allocated from ranges of possible labels of a label space. In another embodiment, labels are allocated from a partition within a label space. A partition is a sub-range of possible labels within a label space. Different partitions within a label space are mutually exclusive. In one embodiment, label requests for a partition indicate ranges. In another embodiment, label requests, which may indicate ranges, are allocated in accordance with a range of labels within the partition.

Another embodiment provides for reliable restoration of a restarted client's label space without interrupting traffic traveling on LSPs established by the restarted client. In one embodiment, labels are restored from ranges of labels. Another embodiment provides for efficient look-up of labels in a label forwarding information base (LFIB) indexed by partitions. The embodiments described herein may be practiced independently or may be practiced together, or in different combinations.

In one embodiment, label requests indicate ranges of requested labels to be allocated from a partition.

Range Based Tracking of Labels

Figure 1:
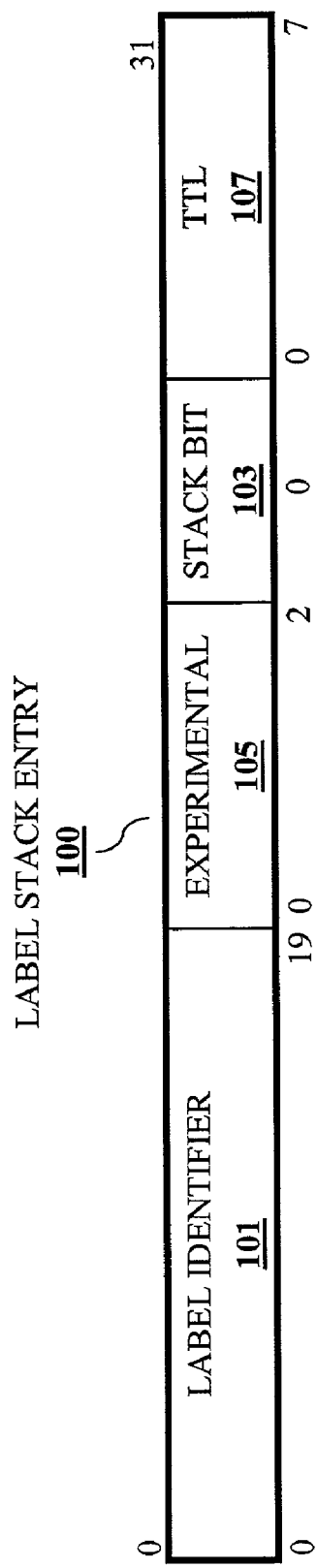
FIG. 1 (Prior Art) is a diagram of a label stack entry according to multi-protocol label switching (MPLS).
Figure 2:
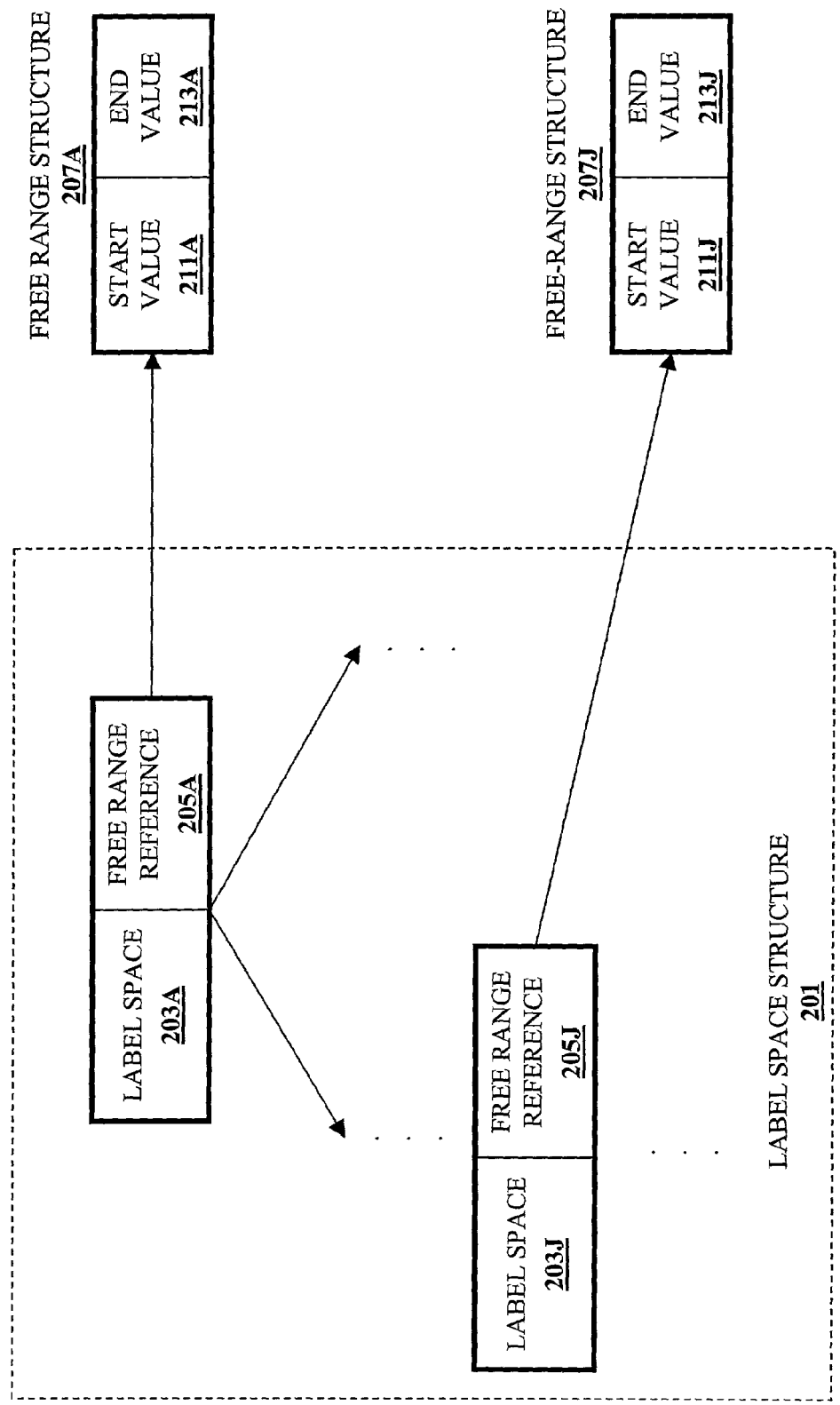
FIG. 2 is an exemplary diagram illustrating data structures used for label allocation according to one embodiment of the invention.

FIG. 2 is an exemplary diagram illustrating data structures used for label allocation according to one embodiment of the invention. A label space structure 201 includes multiple elements for different label spaces. In FIG. 2, a first element of the label space structure 201 includes a label space field 203A and a free-range reference field 205A. A second element of the label space structure 201 includes a label space field 203J and a free-range reference field 205J. The label space fields 203A-203J each indicate different label spaces. Various embodiments may indicate different label spaces differently. In one embodiment, each of the label space fields 203A-203J indicates a unique value identifying a label space. In another embodiment, each of the label space fields 203A-203J indicates a value corresponding to different interfaces associated with different label spaces. In another embodiment, each of the label space fields 203A-203J indicates a concatenation of an interface identifier and a label space identifier. In another embodiment with multiple contexts (i.e., a collection of information and/or modules associated with a set of rules and/or policies), each having a single label space, each of the label space fields 203A-203J indicates a context identifier. In another embodiment with multiple contexts, each capable of having multiple label spaces, each of the label space fields 203A-203J indicates a combination of a label space identifier and a context identifier (e.g., concatenation, hash, etc.).

Each of the free-range reference fields 205A-205J respectively reference free-range structures 207A-207J. The free-range structure 207A includes a single element, which element includes a start value field 211A and an end value field 213A. The free-range structure 207J includes a singe element, which element includes a start value field 211J and an end value field 213J. As long as free labels are within a single contiguous range, then a free-range structure will remain a single element data structure. Once there are non-contiguous ranges, the free-range structure will have an element for each of the non-contiguous ranges. The start value field 211A and the end value field 213A indicate values that are the end points of the range for the label space indicated in the label space field 203A. Likewise, the start value field 211J and the end value field 213J indicate values which are the end points of the range of labels for the label space identified in the label space field 203J. Various embodiments may implement the label space structure 201 and the free-range structures 207A-207J differently (e.g., hash tables, binary search trees, splay trees, radix tries, etc.).

Maintaining data structures of ranges that reflect labels that have been allocated enables more efficient label allocation. Instead of traversing an array of allocated labels, a few elements of a free-ranges structure are accessed, as described later herein. Although hundreds of labels may have been allocated, the free-range structure may include a relatively small number of elements for free ranges and possibly still be a single element data structure.

Figure 3A:
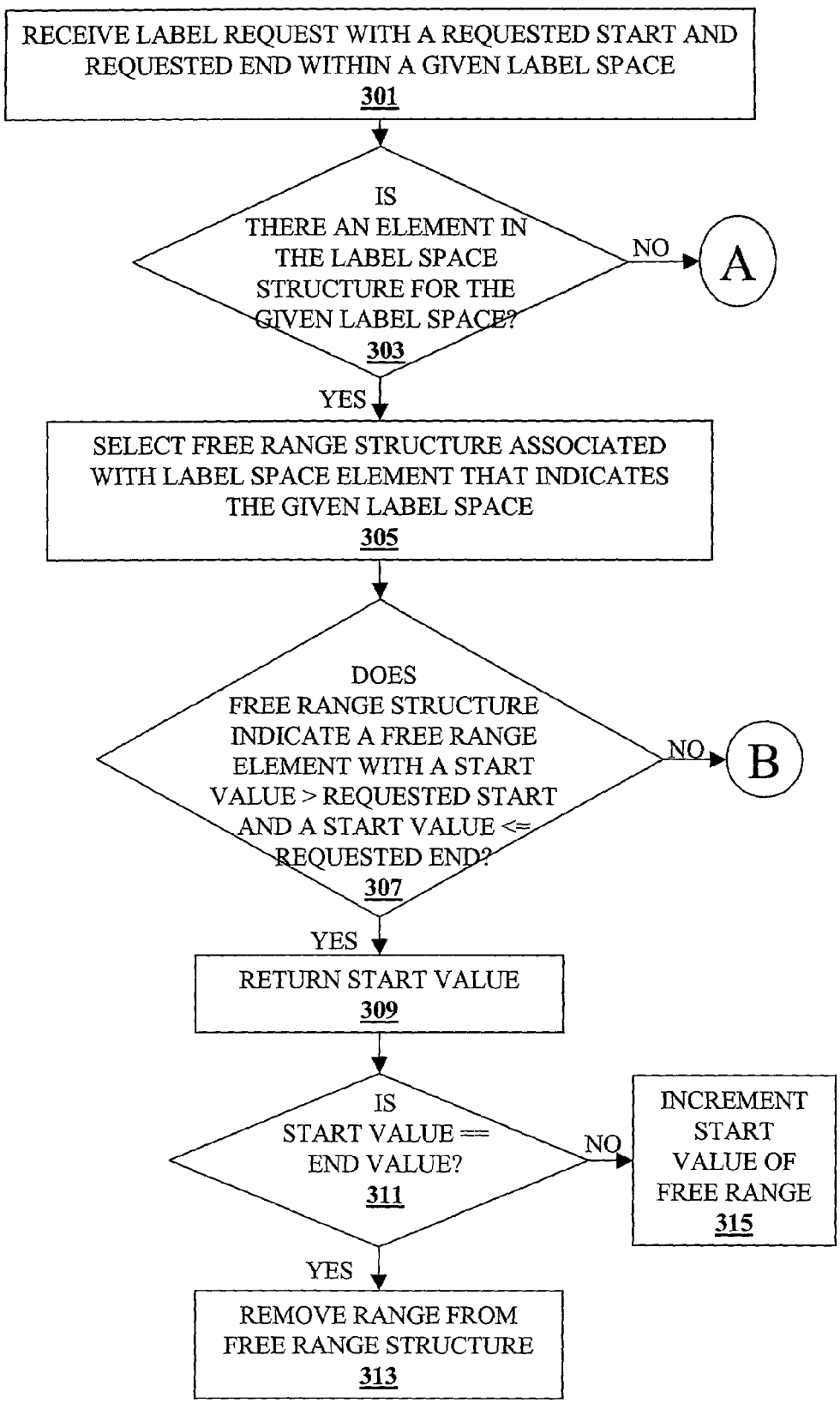
FIG. 3A is a flow chart for allocating labels according to one embodiment of the invention.
Figure 3B:
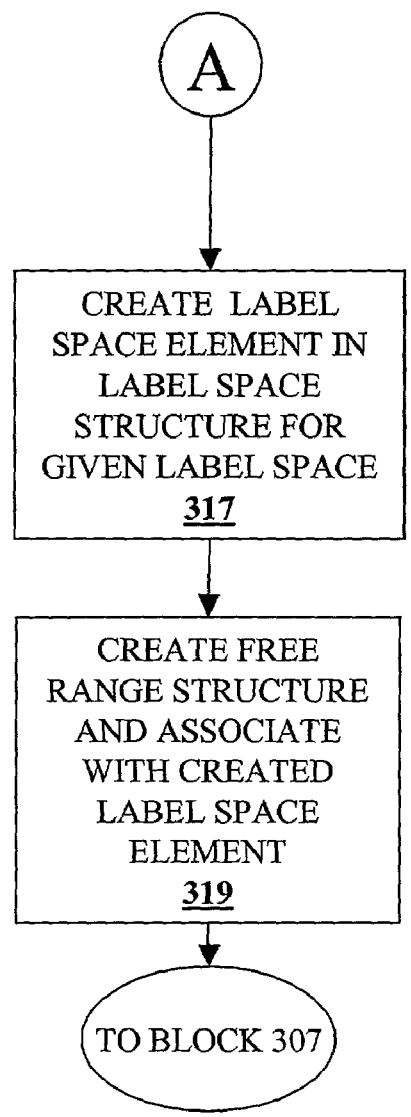
FIG. 3B is a flow chart continuing from FIG. 3A for allocating labels according to one embodiment of the invention.
Figure 3C:
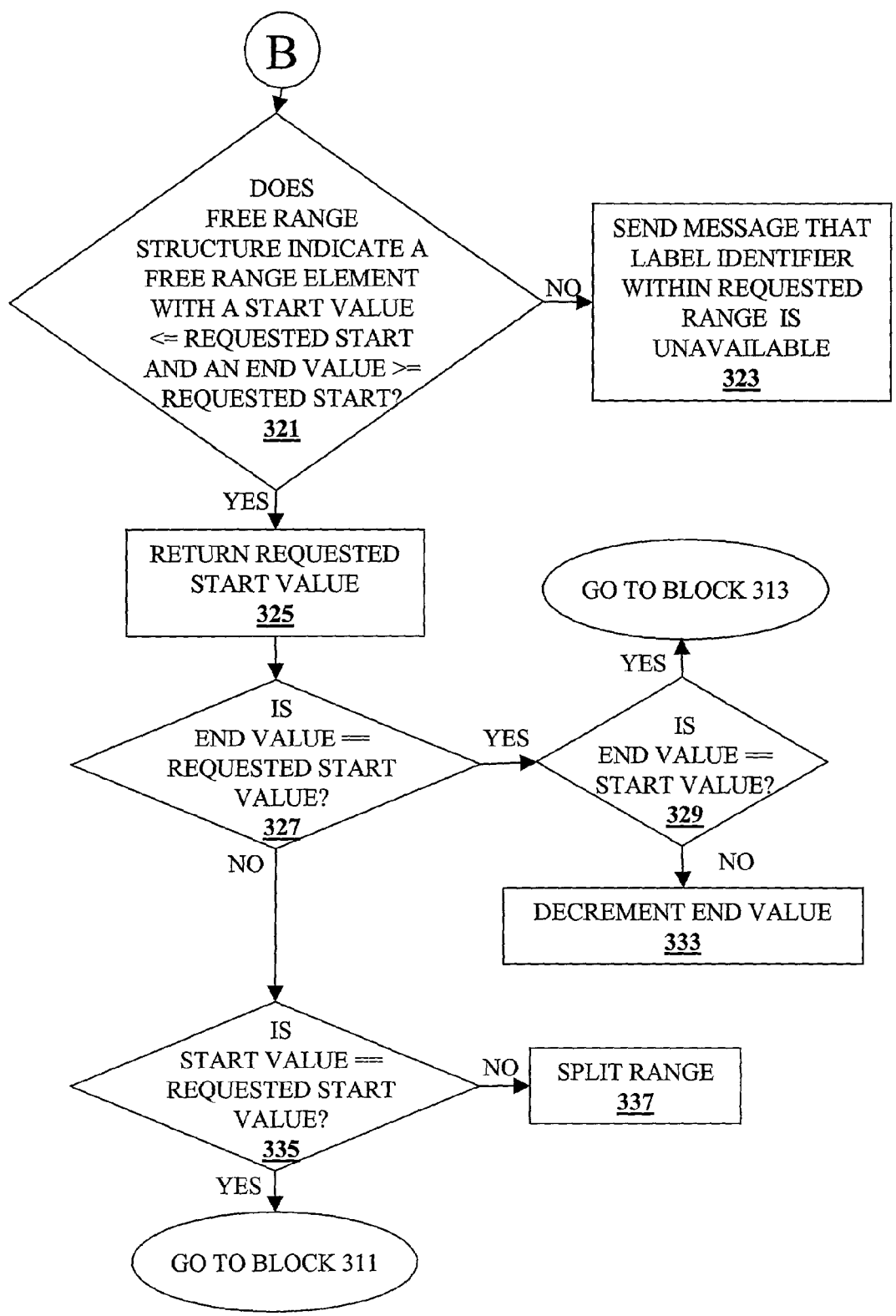
FIG. 3C is a flow chart continuing from the flow chart of FIG. 3A for allocating labels according to one embodiment of the invention.

FIGS. 3A-3C are flow charts for allocating labels according to one embodiment of the invention. FIG. 3A is a flow chart for allocating labels according to one embodiment of the invention. At block 301, a label request is received from a module (e.g., a signaling protocol module) that indicates a requested start value and a requested end value within a given label space. The requested start and end values may be endpoints of the entire range of the given label space or endpoints of a range within the given label space. At block 303, it is determined if there is a label space element in the label space structure for the given label space. If there is not a label space element in the label space structure for the given label space, then control flows to block 317. If there is a label space element in the label space structure for the given label space, then control flows to block 305.

At block 305, the free range structure associated with the label space element that indicates the given label space is selected. At block 307, it is determined if the free range structure indicates a free range element with a start value greater than the requested start value and less than or equal to the requested end value (i.e., is there a free range element with a start value within the range of the label request). If the free range structure does not indicate a free range element with a start value greater than the requested start value and less than or equal to the requested end value, then control flows to block 321. If the free range structure indicates a free range element with a start value greater than the requested start value and less than or equal to the requested end value, then control flows to block 309.

At block 309, the start value of the free range element meeting the criteria is returned. At block 311, it is determined if the start value is equal to the end value. If the start value is not equal to the end value, then control flows to block 315. If the start value is equal to the end value, then control flows to block 313. At block 315, the start value of the free range element is incremented. At block 313, the free range element is removed from the free range structure. Removing a free range element may involve de-allocation of a free range element or modification of data in the free range element.

FIG. 3B is a flow chart continuing from FIG. 3A for allocating labels according to one embodiment of the invention. At block 317, a label space element is created in the label space structure for the given label space. At block 319, a free range structure is created and associated with the created label space element. In one embodiment, the free range structure indicates the entire range of labels for the given label space. From block 319, control flows to block 307.

FIG. 3C is a flow chart continuing from the flow chart of FIG. 3A for allocating labels according to one embodiment of the invention. Block 321 receives control from block 307. At block 321, it is determined if the free range structure indicates a free range element with a start value less than or equal to the requested start value and an end value greater than or equal to the requested start value (i.e., it is determined if the requested start value is within a range indicated by a free range element). If the free range structure does not indicate a free range element with a start value less than or equal to the requested start value and an end value greater than or equal to the requested start value then control flows to block 323. If the free range structure indicates a free range element with a start value less than or equal to the requested start value and an end value greater than or equal to the requested start value, then control flows to block 325.

At block 323, a message indicating that a label within the requested range is unavailable is sent to the requesting module.

At block 325, the requested start value is returned. At block 327, it is determined if the free range element's end value is equal to the requested start value. If the end value is equal to the requested start value, then control flows to block 329. If the end value is not equal to the requested start value, then control flows to block 335.

At block 329, it is determined if the end value of the free range element is equal to the start value of the free range. If the end value is equal to the start value, then control flows to block 313. If the end value is not equal to the start value, then control flows to block 333. At block 333 the end value is decremented.

At block 335, it is determined if the start value of the free range element is equal to the requested start value. If the start value of the free range element is equal to the requested start value, then control flows to block 311. If the start value of the free range element is not equal to the requested start value then control flows to block 337. At block 337 the free range element is split. The free range will be split into a first and second free range element: 1) the first free range element indicating the start value of the original free range element and an end value equal to the requested start value minus one; and 2) the second free range element indicating a start value equal to the requested start value plus one and an end value equal to the end value of the original free range element.

While the flow diagrams in the Figures show a particular order of operations performed by certain embodiments of the invention, it should be understood that such order is exemplary (e.g., alternative embodiments may perform certain of the operations in a different order, combine certain of the operations, perform certain of the operations in parallel, etc.). For example, block 321 and subsequent corresponding operations may be performed before block 307 and its subsequent corresponding operations. As another example, the comparison operators may be oriented differently. In addition, update operations performed on the ranges after a label has been allocated may be performed differently.

Allocating labels in accordance with a free-range structure improves performance time for label allocation. Fewer lookups are necessary to allocate a label. In addition, maintaining ranges of free labels utilizes a relatively small amount of memory. Allocating labels in accordance with ranges also provides flexibility for managing multiple label spaces within a network device.

Figure 4A:
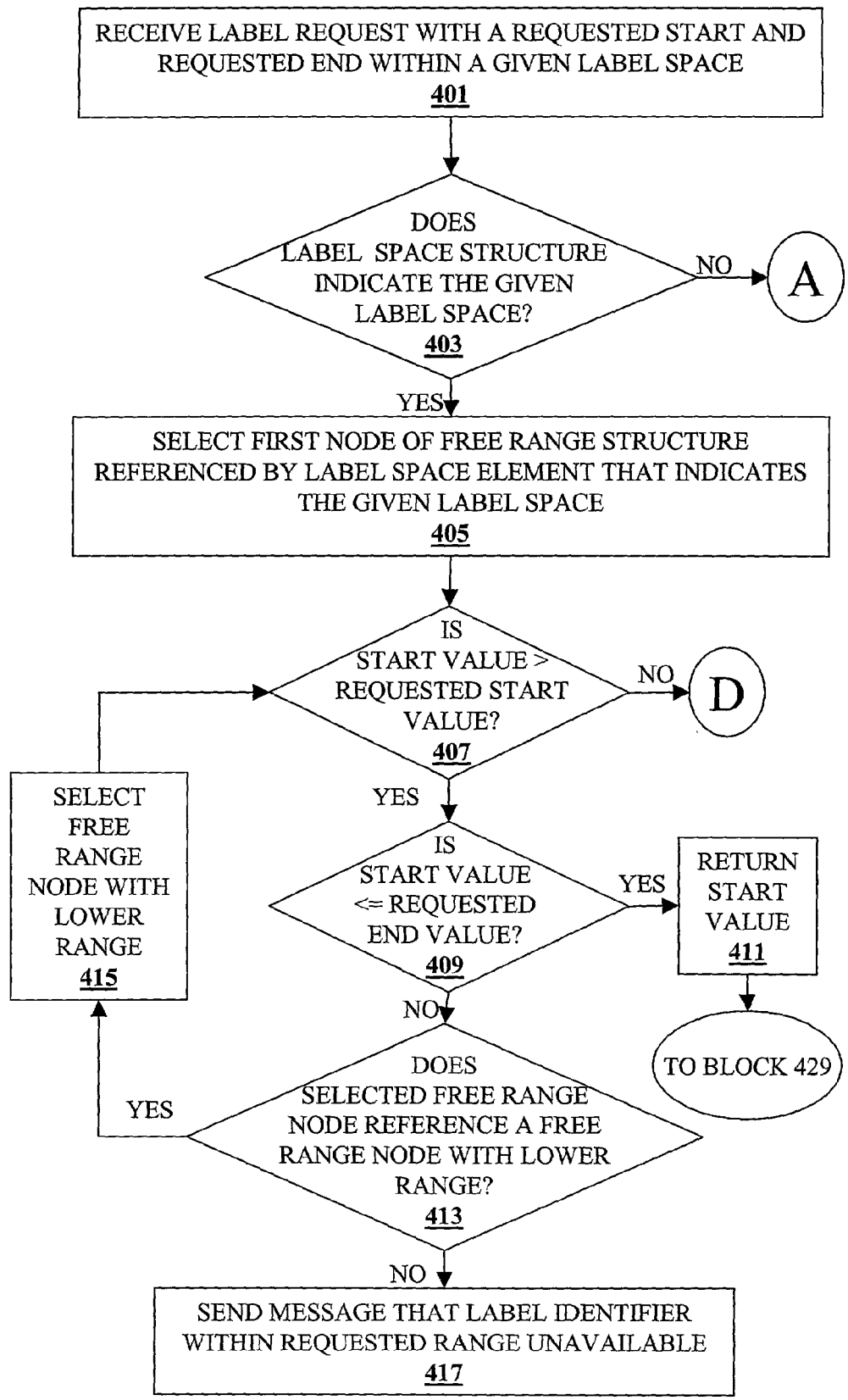
FIG. 4A is a flow chart for allocating label identifiers from a splay tree according to one embodiment of the invention.
Figure 4B:
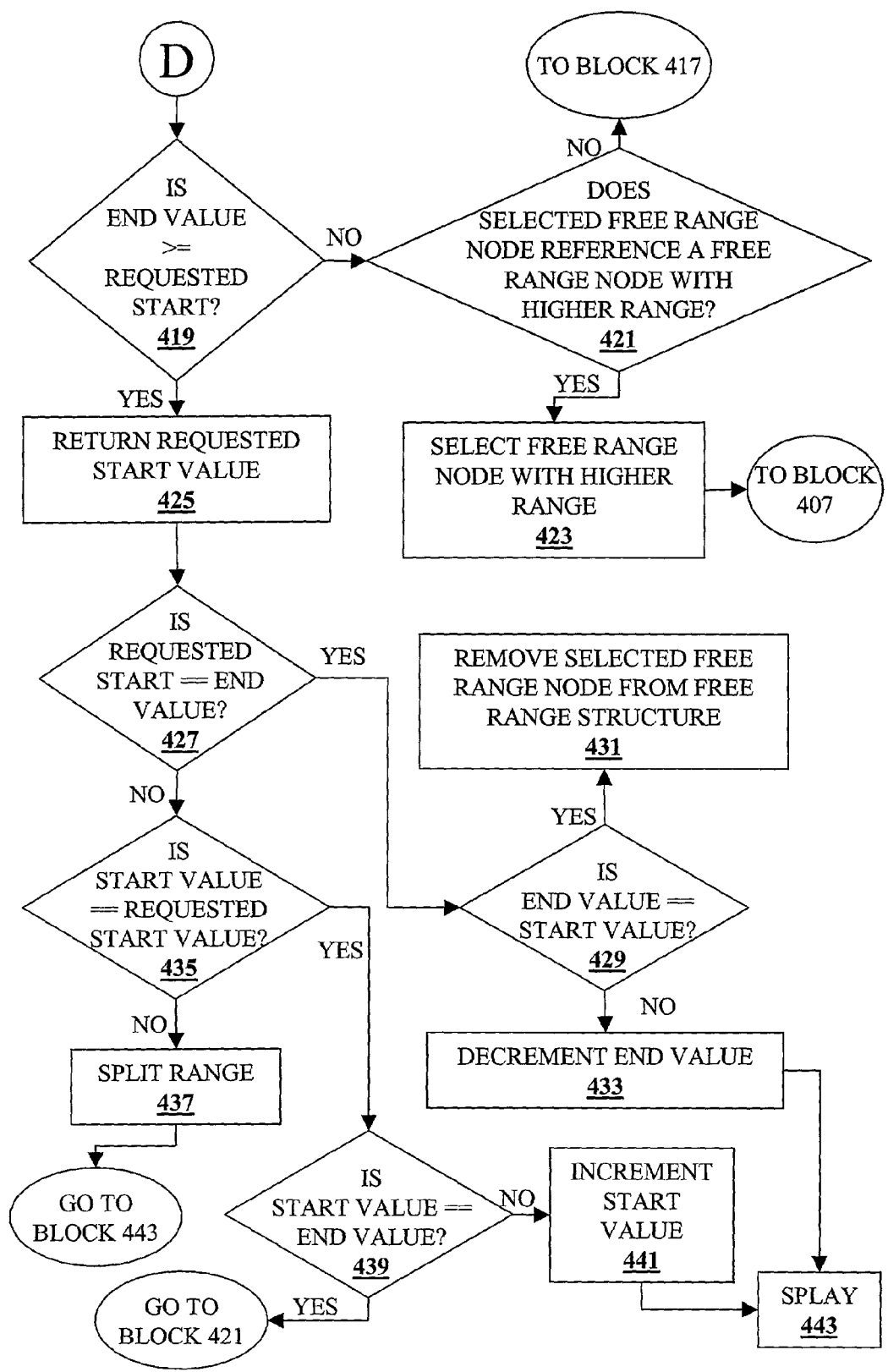
FIG. 4B is a flow chart continuing from FIG. 4A according to one embodiment of the invention.

FIGS. 4A-4B are flowcharts for allocating labels from ranges indicated in a splay tree according to one embodiment of the invention. FIG. 4A is a flow chart for allocating labels from a splay tree according to one embodiment of the invention. At block 401, a label request is received from a requesting module with a requested start value and a requested end value within a given label space. At block 403, it is determined if the label space structure indicates the given label space. If the label space structure does not indicate the given label space, then control flow to block 317 of FIG. 3B. If the label space structure indicates the given label space, then control flows to block 405.

At block 405 the first node of the free range structure referenced by the label space element that indicates the given label space is selected. At block 407, it is determined if the start value of the selected node is greater than the requested start. If the start value is not greater than the requested start value, then control flows to block 419. If the start value is greater than the requested start value, then control flows to block 409.

At block 409 it is determined if the start value is less than or equal to the requested end value. If the start value is less than or equal to the requested end value, then control flows to block 411. If the start value is not less than or equal to the requested end value, then control flows to block 413.

At block 411, the start value is returned. From block 411 control flows to block 429.

At block 413, it is determined if the selected free range node references a node with a lower range. If the selected free range node references a node with a lower range, then control flows to block 415. If the selected free range node does not reference a node with a lower range, then control flows to block 417.

At block 415, the free range element with the lower range is selected. From block 415 control flows back to block 407.

At block 417, a message indicating that a label within the requested range is unavailable is sent to the requesting module.

FIG. 4B is a flow chart continuing from FIG. 4A according to one embodiment of the invention. Block 419 receives control from block 407. At block 419, it is determined if the end value of the selected free range node is greater than or equal to the requested start value. If the end value of the selected free range node is not greater than or equal to the requested start value, then control flows to block 421. If the end value of the selected free range node is greater than or equal to the requested start value, then control flows to block 425.

At block 421 it is determined if the selected free range node references a free range node with a higher range. If the selected free range node does not reference a free range node with a higher range, then control flows back to block 417. If the selected free range node references a free range node with a higher range, then control flows to block 423. At block 423, the free range node with the higher range is selected. From block 423 control flows back to block 427.

At block 425, the requested start value is returned. At block 427 it is determined if the requested start value is equal to the end value of the selected free range node. If the requested start value is equal to the end value of the selected free range node, then control flows to block 429. If the requested start value is not equal to the end value of the selected free range node, then control flows to block 425.

At block 429 it is determined if the start value of the selected free range node is equal to the end value of the selected free range node. If the start value of the selected free range node is equal to the end value of the selected free range node then control flows to block 421. If the start value of the selected free range node is not equal to the end value of the selected free range node, then control flows to block 441. At block 431, the selected free range node is removed from the free range structure.

At block 433, the end value of the selected free range node is decremented. At block 443, the free range structure is splayed (i.e., one or more operations are performed to rotate the selected free range element to the root of the free range structure).

At block 435, it is determined if the start value of the selected free range node is equal to the requested start value. If the start value of the selected free range node is equal to the requested start value, then control flows to block 439. If the start value is not equal to the requested start value, then control flows to block 437.

At block 439 it is determined if the start value of the selected free range node is equal to the end value of the selected free range node. If the start value of the selected free range node is not equal to the end value of the selected free range node then control flows to block 431. If the start value of the selected free range node is equal to the end value of the selected free range node then control flows to block 431.

At block 441, the start value of the selected free range node is incremented. Control flows from block 441 to block 443.

At block 437, the selected free range node is split. The selected free range node is split into two nodes: 1) a first node having a start value equal to the original free range node's start value and an end value equal to the requested start value minus 1; and 2) a second node with a start value equal to the requested start value plus 1 and an end value equal to the end value of the original free range node. From block 437 control flows to block 443.

Alternative embodiments may allocate labels differently while still reflecting allocated labels with ranges. For example, a label request may indicate a specific label. In another example, a label request neither indicates a label nor a range of labels, but instead accepts the label that is allocated by the label allocation manager, hence making it possible to avoid splitting ranges. In addition, creating a label request that indicates ranges, eases programming requirements since an object that can indicate ranges may be used to indicate a specific label by indicating a range of a single label, a null range to indicate acceptance of any label, etc. In such an embodiment, the label allocation manager may allocate labels from ranges differently (e.g., allocate the lowest label available, continue allocating labels sequentially regardless of lower labels that have been released, etc.).

Maintaining free ranges within a splay tree further improves upon the performance enhancement provided by allocating labels from ranges. The properties of a splay tree contribute to further gain in efficiency in label allocation. The splaying of the free range structure increases the likelihood that a label is allocated after accessing a single element of the free range structure since labels are typically allocated sequentially.

Figure 5:
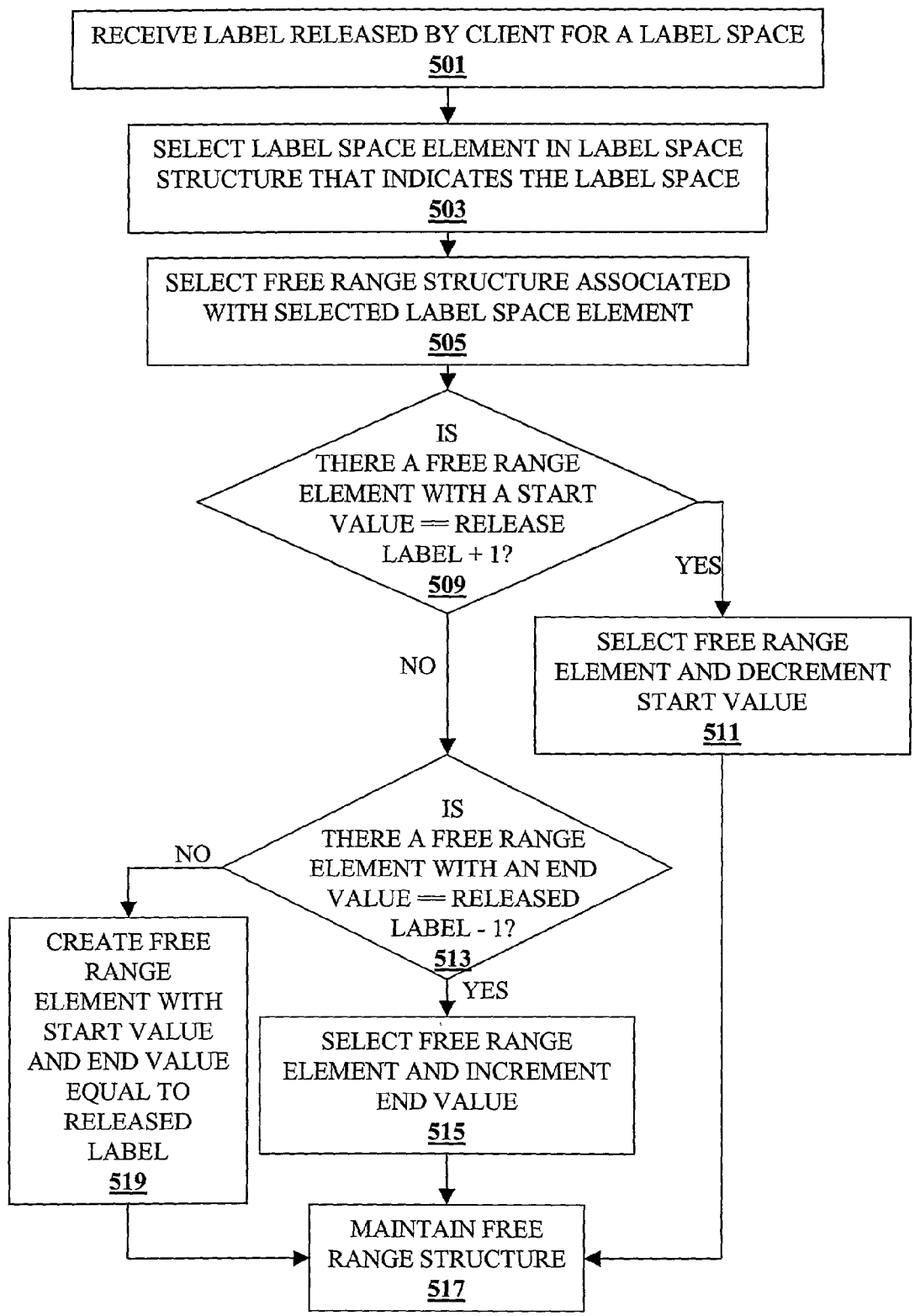
FIG. 5 is a flow chart for releasing an allocated label identifier according to one embodiment of the invention.

FIG. 5 is a flow chart for releasing an allocated label according to one embodiment of the invention. At block 501, a label released by a client for a label space is received. At block 503, a label space element in the label space structure that indicates the label space is selected. At block 505, a free range structure linked to the selected label space element is selected. At block 509, it is determined if there is a free range element within the selected free range structure with a start value equal to the released label plus 1. If there is not a free range element with a start value equal to the released label plus 1, then control flows to block 513. If there is a free range element with a start value equal to the released label plus 1, then control flows to block 511.

At block 511, the start value of the selected free range element is decremented. At block 517, the free range structure is maintained (e.g., tree balancing).

At block 513, it is determined if there is a free range element with an end value equal to the released label minus 1. If there is a free range element with an end value equal to the released label minus 1, then control flows to block 515. If there is not a free range element with an end value equal to the released label minus 1, then control flows to block 519.

At block 515, the free range element with an end value equal to the released label minus 1 is selected and its end value is incremented. Control flows from block 515 to block 517. At block 519, a free range element with both a start value and end value equal to the released label is created. From block 519 control flows to block 517.

Figure 6:
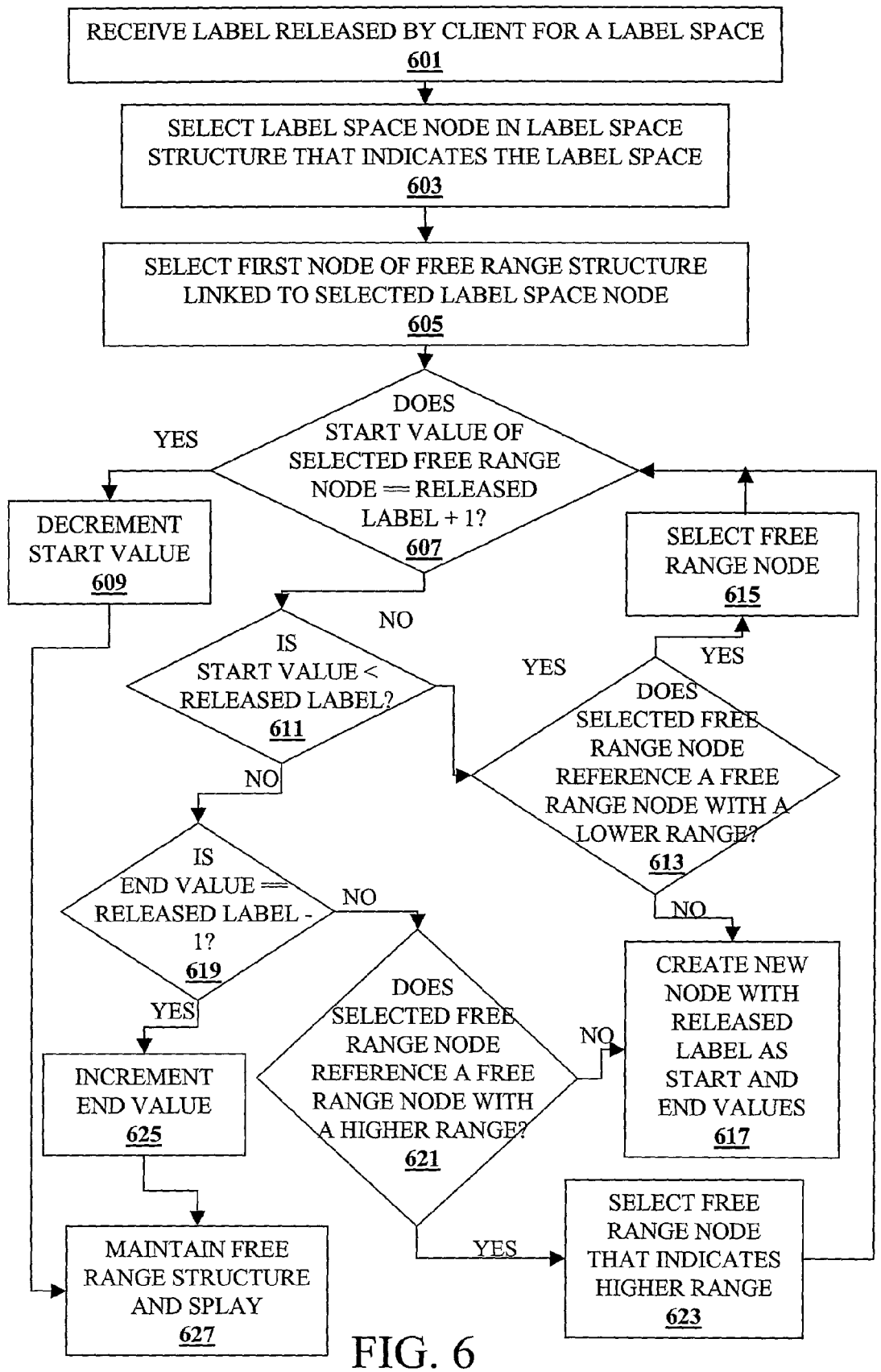
FIG. 6 is a flowchart for releasing a label allocated from a splay tree according to one embodiment of the invention.

FIG. 6 is a flowchart for releasing a label allocated from a splay tree according to one embodiment of the invention. At block 601, a label released by a client for a label space is received. At block 603, a label space node in the label space structure that indicates the label space is selected. At block 605, the first node of the free range structure linked to the selected label space node is selected. At block 607, it is determined if the start value of the selected free range node is equal to the released label plus 1. If the start value of the selected free range element is equal to the released label plus 1, then control flows to block 609. If the start value of the selected free range node is not equal to the released label plus 1, then control flows to block 611.

At block 609, the start value of the selected free range node is decremented. At block 627, maintenance operations are performed on the free range structure and the free range structure is splayed.

At block 611, it is determined if the start value of the selected free range node is less than the released label. If the start value is less than the released label then control flows to block 613. If the start value is not less than the released label then control flows to block 619.

At block 613 it is determined if the selected free range node references a free range node with a lower range. If the selected free range node does not reference a free range node with a lower range, then control flows to block 617. If the selected free range node references a free range node with a lower range, then control flows to block 615.

At block 615, the free range node with the lower range is selected. Control flows from block 615 to block 607.

At block 617, a new free range node with the released label as its start value and end value is created. Control flows from block 625 to block 627.

At block 619 it is determined if the end value of the free range node is equal to the released label minus 1. If the end value is equal to the released label minus 1, then control flows to block 625. If the end value is not equal to the released label minus 1, then control flows to block 621.

At block 621 it is determined if the selected free range node references a free range node with a higher range. If the selected free range node references a free range node with a higher range, then control flows to block 623. If the selected free range node does not reference a free range node with a higher range, then control flows to block 617. At block 623, the free range node that indicates the higher range is selected. Control flows from block 623 to block 607.

At block 625 the end value of the selected free range node is incremented. From block 625 control flows to block 627.

As previously stated, allocating labels in accordance with ranges of labels improves the efficiency of label allocation. Allocating labels in accordance with ranges improves the performance of label allocation since a label is allocated from a range instead of walking through an array of allocated labels. Moreover, the relative inexpensiveness of free-range structures provides the flexibility to manage a relatively large number of label spaces within a network device.

Although label ranges have been described has free ranges (i.e., ranges of unallocated labels), alternative embodiments of the invention may allocate labels in accordance with label ranges that indicate allocated labels.

Furthermore, the described method of allocating labels may be used for allocation of other resource identifiers (e.g., adjacency identifiers).

Label Space Partitions

Although some embodiments request and allocate labels from a range of an entire label space, in other embodiments label spaces may be logically partitioned. A partition is a range of contiguous labels ("label sub-space") within a label space designated for a certain process or module. For example, if a label space consists of labels 0 through $2^{19}-1$, a partition designated to RSVP may consist of the labels $2^{16}$ through $2^{17}-1$. RSVP only requests labels that are not outside of its partition and only labels that are not outside its partition are allocated for RSVP. Partitions within the same label space are mutually exclusive in order to avoid collisions of labels between different clients.

Figure 7A:
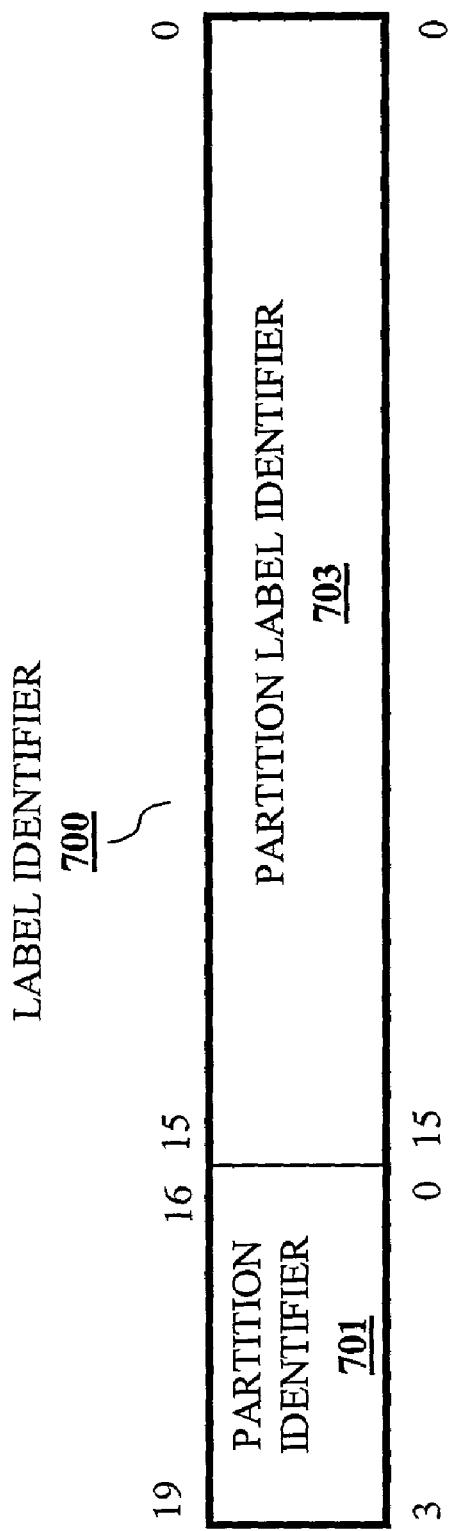
FIG. 7A is an exemplary diagram illustrating a label identifier for label space partitioning according to one embodiment of the invention.

FIG. 7A is an exemplary diagram illustrating a label for label space partitioning according to one embodiment of the invention. In FIG. 7, a label 700 is a 20-bit value including the following fields: a partition identifier field 701 and a partition label field 703. The partition label field 703 indicates a 16-bit value comprising bits 0-15 of the label space identifier 700. The partition identifier field 701 indicates a 4-bit value that identifiers a partition within a label space. The partition identifier field 701 comprises bits 16-19 of the label 700.

Figure 7B:
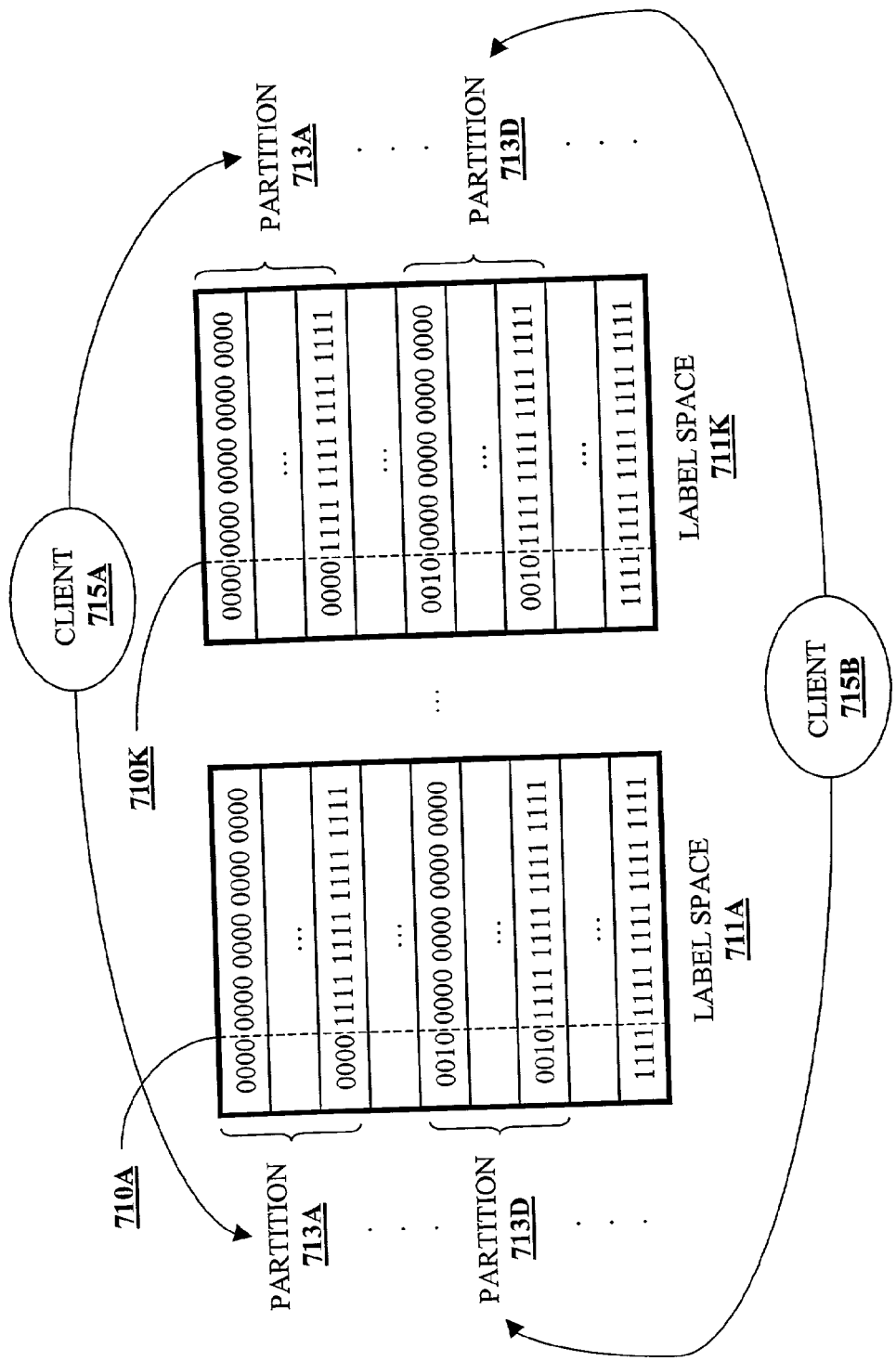
FIG. 7B is a conceptual diagram illustrating exemplary label spaces with partitions according to one embodiment of the invention.

FIG. 7B is a conceptual diagram illustrating exemplary label spaces with partitions according to one embodiment of the invention. Label spaces 711A-711K are illustrated in FIG. 7B as having labels 0 through $2^{19}-1$. A dashed line 710A separates the partition identifier field from the partition label field of the possible labels within the label space 711A. Similarly, a dashed line 710K separates the partition identifier field from the partition label field of the possible labels within the label space 711K. Each of the label spaces 711A-711K includes multiple partitions. In FIG. 7B, partition 713A and partition 713D are illustrated. Partition 713A in FIG. 7B includes the possible labels 0 through $2^{16}-1$. Partition 713D in FIG. 7B includes the possible labels $2^{17}$ through $2^{16}+2^{17}-1$. A client 715A (e.g., a signaling protocol module) uses labels that are not outside of the partition 713A across the label spaces 711A-711K. A client 715B uses labels that are not outside of the partition 713D across the label spaces.

FIG. 7C is a conceptual diagram illustrating exemplary contexts with partitioned label spaces according to one embodiment of the invention. In FIG. 7C, each of the contexts 717A-717C include one or more label spaces. The context 717A includes label spaces 711A-711K. The context 717C includes a label space 711J. As in FIG. 7C, the client 715A uses labels that are not outside of the partition 713A, but the client 715A uses labels that are not outside of the partition 715A across label spaces and contexts. Likewise, the client 715B uses labels that are not outside of the partition 713D, but the client 715A uses labels that are not outside of the partition 715D across label spaces and contexts.

Partitioning a label space enables modularization of label space allocation. Ranges of labels for individual partitions can be maintained in separate free range structures and allocated by individual label allocation managers. This modularization enables clients (e.g., a signaling protocol module , a static LSP module, etc.) to manage their own partitions and reduces inter-process communications. While in one embodiment, client identifiers are associated with their partition identifiers, in alternative embodiments different techniques are used (e.g., partition identifiers are used as client identifiers for inter-process communications).

Figure 8:
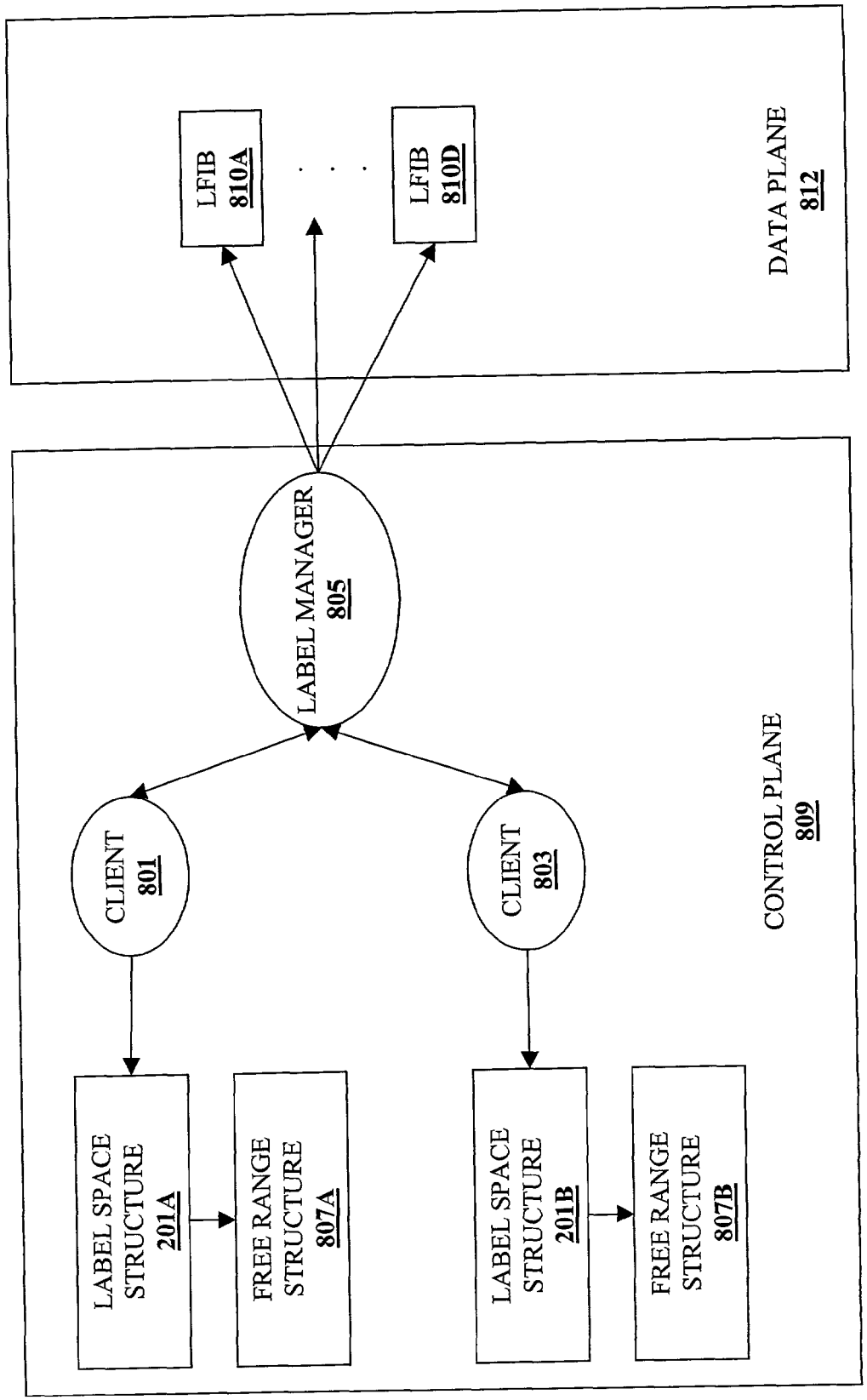
FIG. 8 is an exemplary diagram illustrating clients managing their own partitions according to one embodiment of the invention.

FIG. 8 is an exemplary diagram illustrating clients managing their own partitions according to one embodiment of the invention. In FIG. 8, a control plane 809 includes a client 801 and a client 803. The clients 801 and 803 may be signaling protocol modules (e.g., RSVP, LDP, BGP, etc.), a static LSP module, etc. The client 801 allocates labels for its partition from a free-range structure 807A via the label space structure 201A. The client 803 allocates labels for its partition from a free-range structure 807B via the label space structure 201B. The label space structures 201A and 201B are individual instantiations of the same label space information. In FIG. 8, a single free-range structure is illustrated for each of the clients 801 and 803, hence a single label space has been configured in the control plane 809. As additional label spaces are configured in the control plane 809, corresponding free-range structures will be created for partitions that are not outside of the configured label spaces. The free-range structure 807A indicates the client's 801 partition while the free-range structure 807B indicates the client's 803 partition. Various embodiments may implement the free range structures for a partition differently. For example, in one embodiment the free range structures for different partitions may indicate the same free range of 0 through $2^{16}-1$ (i.e., unallocated partition labels). In such an embodiment, when a partition label is allocated, the corresponding partition identifier is associated with it. In another embodiment, before any labels are allocated, each free range structure indicates a range of unallocated labels that are not outside of its partition (i.e., the start value and the end value will each be the entire 20-bit label, in an embodiment with 20-bit labels).

It is assumed in FIG. 8 that label allocation managers have been implemented in the clients 801 and 803. Alternative embodiments may implement label allocation managers for each partition separately from the clients 801 and 803. In either embodiment, the partitions allow clients to allocate and release labels independently of each other. Since partitioning allows different clients to allocate and release labels independently of each other, label allocation is decentralized. Decentralizing label allocation reduces inter-process communication, thus improving overall system efficiency.

The clients 801 and 803 inform a label manager 805 of allocated labels of their partitions. The label manager 805 tracks and propagates this information to one or more of label forwarding information bases (LFIBS) 810A-810D in a data plane 812.

Figure 9:
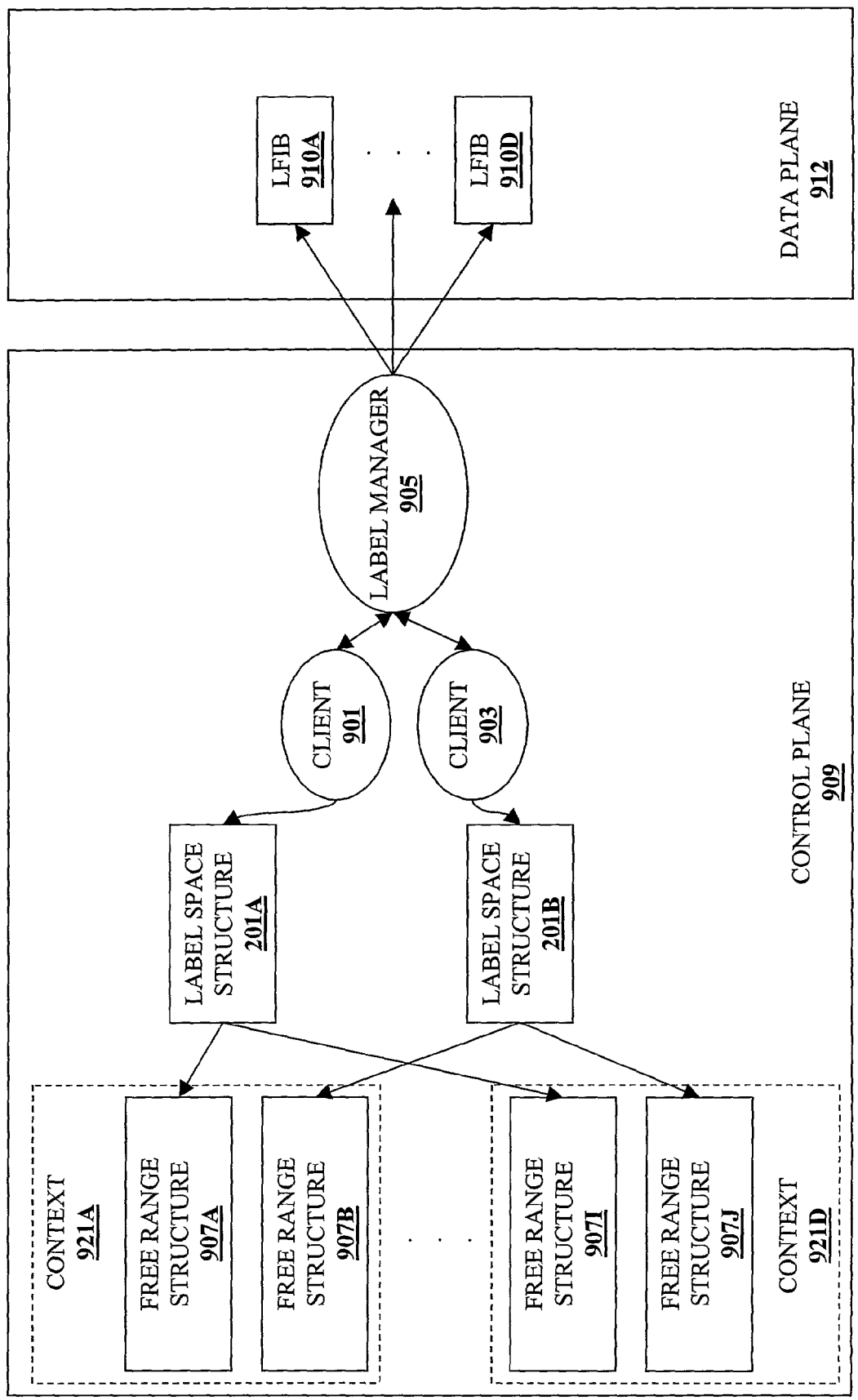
FIG. 9 is an exemplary diagram illustrating clients managing their own partitions within multiple contexts according to one embodiment of the invention.

FIG. 9 is an exemplary diagram illustrating clients managing their own partitions within multiple contexts according to one embodiment of the invention. In FIG. 9, the context 921A includes free-range structures 907A-907B. A context 921D includes free-range structures 907I-907J. FIG. 9 illustrates a single free range structure for each client 901 and 903 within each label space of the contexts 921A-921D. Each of the contexts 921A-921D may have additional label spaces configured, and other label spaces may be configured in the control plane 909 independent of the contexts 921A-921D. As previously described, the free range structures 907A-907J may indicate the range of free partition labels. If partition labels are represented by 14-bit values, then initial range indicated by the free range structures 907A-907J will be zero (0) through $2^{16}-1$. In another embodiment, each of the free range structures 907A-907J may indicate ranges particular to their partition.

The client 901 allocates and releases labels from the free-range structure 907A through the label space structure 201A for the client's 901 partition of the context's 921A label space. The client 901 also allocates and releases labels for its partition in the label space of the context 921D from the free-range structure 907I through the label space structure 201A. The client 903 allocates and releases labels for its partition in the label space of the context 921A from the free-range structure 907B through the label space structure 201B. The client 903 also allocates labels for its partition in the label space of the context 921D from the free-range structure 907J through the label space structure 201B.

The client 901 and 903 inform the label manager 905 of allocated and released labels. Similar to FIG. 8, the label manager 905 tracks and propagates label information for allocated labels to one or more of the LFIBS 910A-910D in a data plane 912.

Although not illustrated in FIGS. 8 and 9, the label manager may be associated with a partition and maintain a structure (e.g., a free range structure) to track labels allocated from the label manager's partition. Some clients in the control plane may not maintain their own partitions or tracking structures, hence the label manager allocates labels and tracks allocated labels from the label manager's partition for such clients.

While in one embodiment, allocated labels that are not outside of a partition are reflected with one or more free ranges corresponding to the partition, alternative embodiments may track label allocation from a partition differently. In one embodiment, allocated labels may be tracked with ranges of allocated labels for a partition. In another embodiment, allocated labels for a partition may not be tracked with respect to ranges. Furthermore, requests for labels that are not outside of a partition may indicate individual labels, ranges of labels, which may correspond to sub-partitions within a client's partition, or may be a request without indicating a label or a range of labels.

Partitioning label spaces for individual clients enables clients to manage their own partitions and provides organizational capabilities. Partitions may be associated with different interfaces, different slots, different peers, etc. In addition, the modularity provided by partitioning enables clients to be restarted and their labels to be restored to a consistent state (i.e., the labels are still usable) without interrupting traffic in the data plane.

Restarting a Client

In one embodiment, each client in the control plane involved with establishing label switched paths, manages its own partition (i.e., allocates and releases labels of their own partition). A process (e.g. label manager) within the control plane tracks allocated labels. After a client restarts, the label manager publishes old labels to the restarted client and the restarted client begins to allocate new labels and confirm previously allocated labels as still being used.

Figure 10:
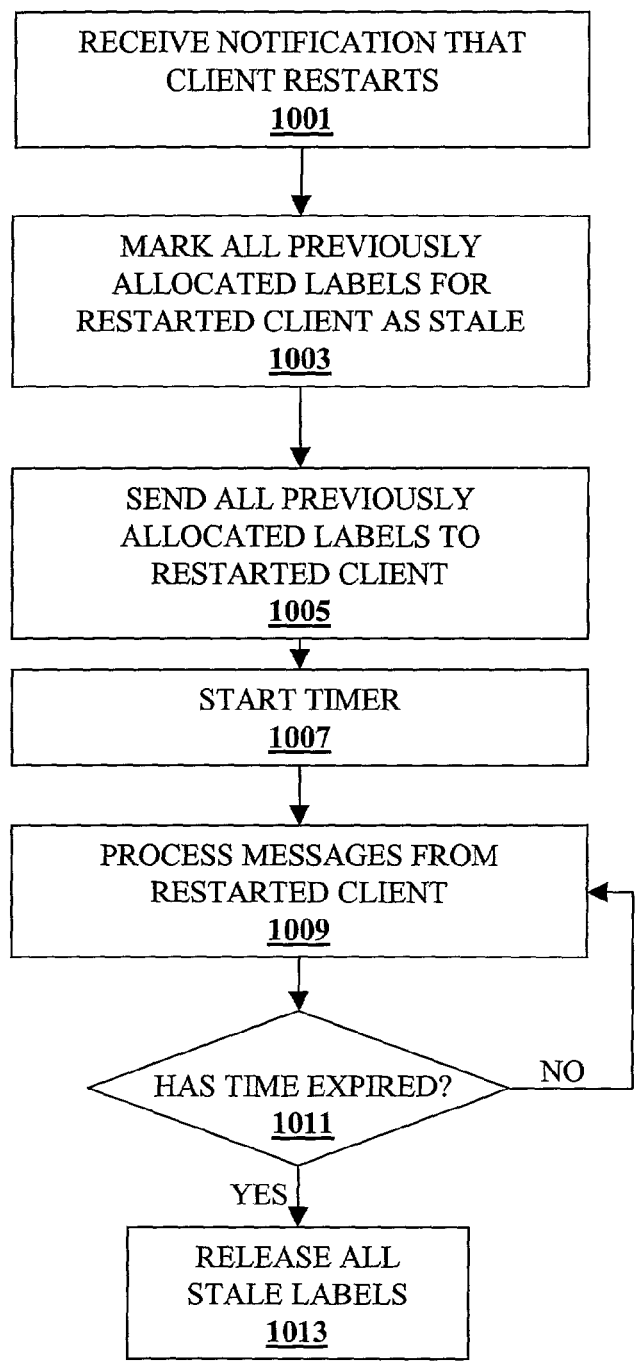
FIG. 10 is a flow chart for publishing labels to a restarted client according to one embodiment of the invention.

FIG. 10 is a flow chart for publishing labels to a restarted client according to one embodiment of the invention. At block 1001, notification that a client restarts is received. At block 1003, all previously allocated labels for the restarted client are marked as stale. At block 1005, all previously allocated labels from the restarted client's partition are sent to the restarted client. At block 1007, a timer is started. At block 1009, messages from the restarted client are processed, as described later herein. At block 1011, it is determined if the timer has expired. If the timer has not expired, then control returns to block 1009. If the timer has expired, then control flows to block 1013. At block 1013, all labels marked as stale are released.

Figure 11:
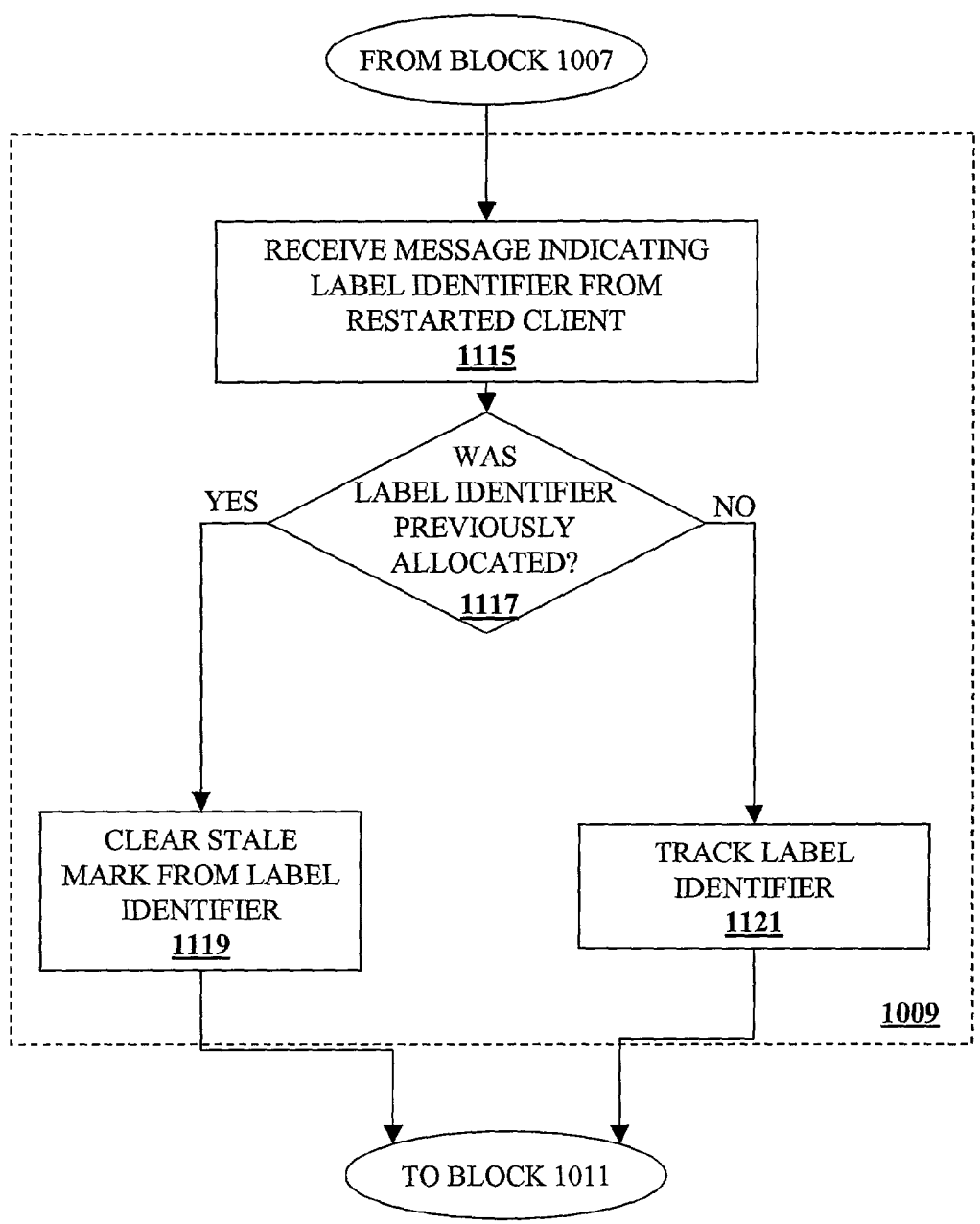
FIG. 11 is a flow chart for performing block 1009 of FIG. 10 according to one embodiment of the invention.

FIG. 11 is a flow chart for performing block 1009 of FIG. 10 according to one embodiment of the invention. Block 1115 receives control from block 1007 of FIG. 10. At block 1115, a message that indicates a label is received from the restarted client. At block 1117, it is determined if the label indicated in the message has previously been allocated. If the label has previously been allocated, then control flows to block 1119. If the label has not previously been allocated, then control flows to block 1121.

At block 1119, the stale marker is cleared from the previously allocated label. Control flows from block 1119 to block 1011. At block 1121, the label is tracked (e.g., a data structure indicating the label and its corresponding forwarding information is created). From block 1121 control flows to block 1011.

Figure 12:
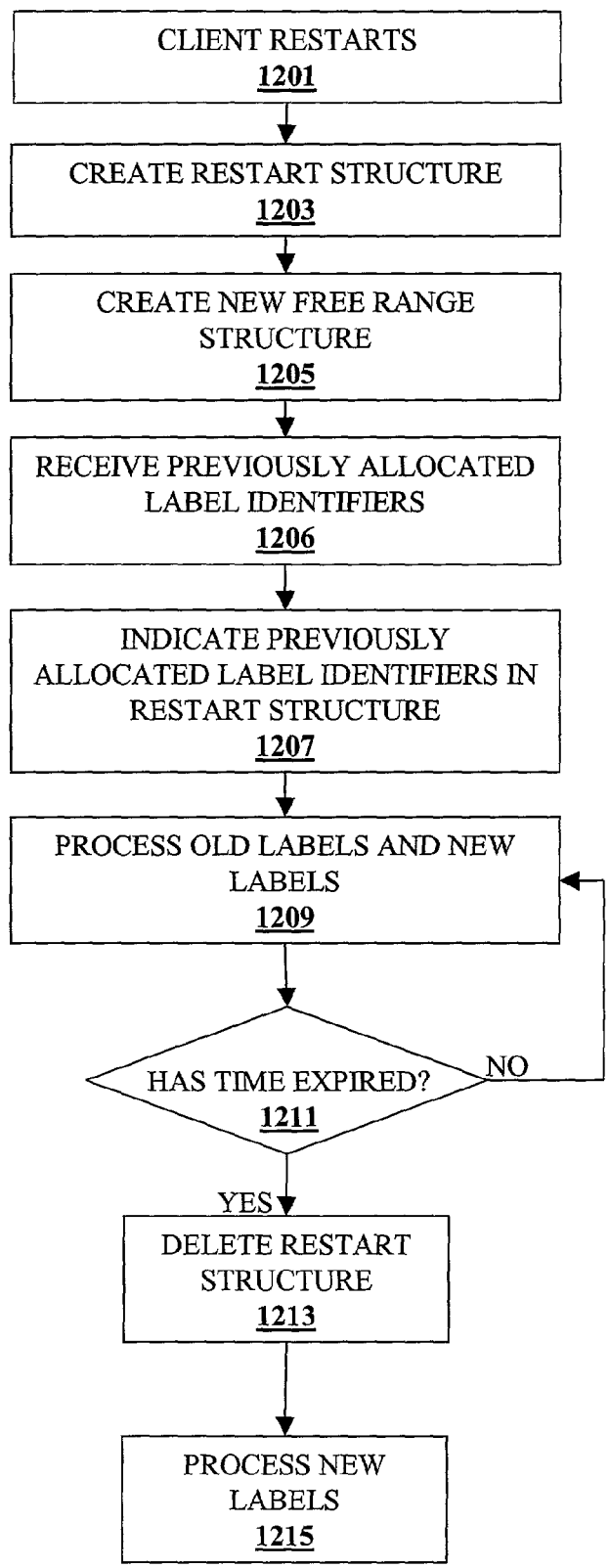
FIG. 12 is an exemplary flow chart for confirming label identifiers and restoring label identifiers according to one embodiment of the invention.
Figure 13:
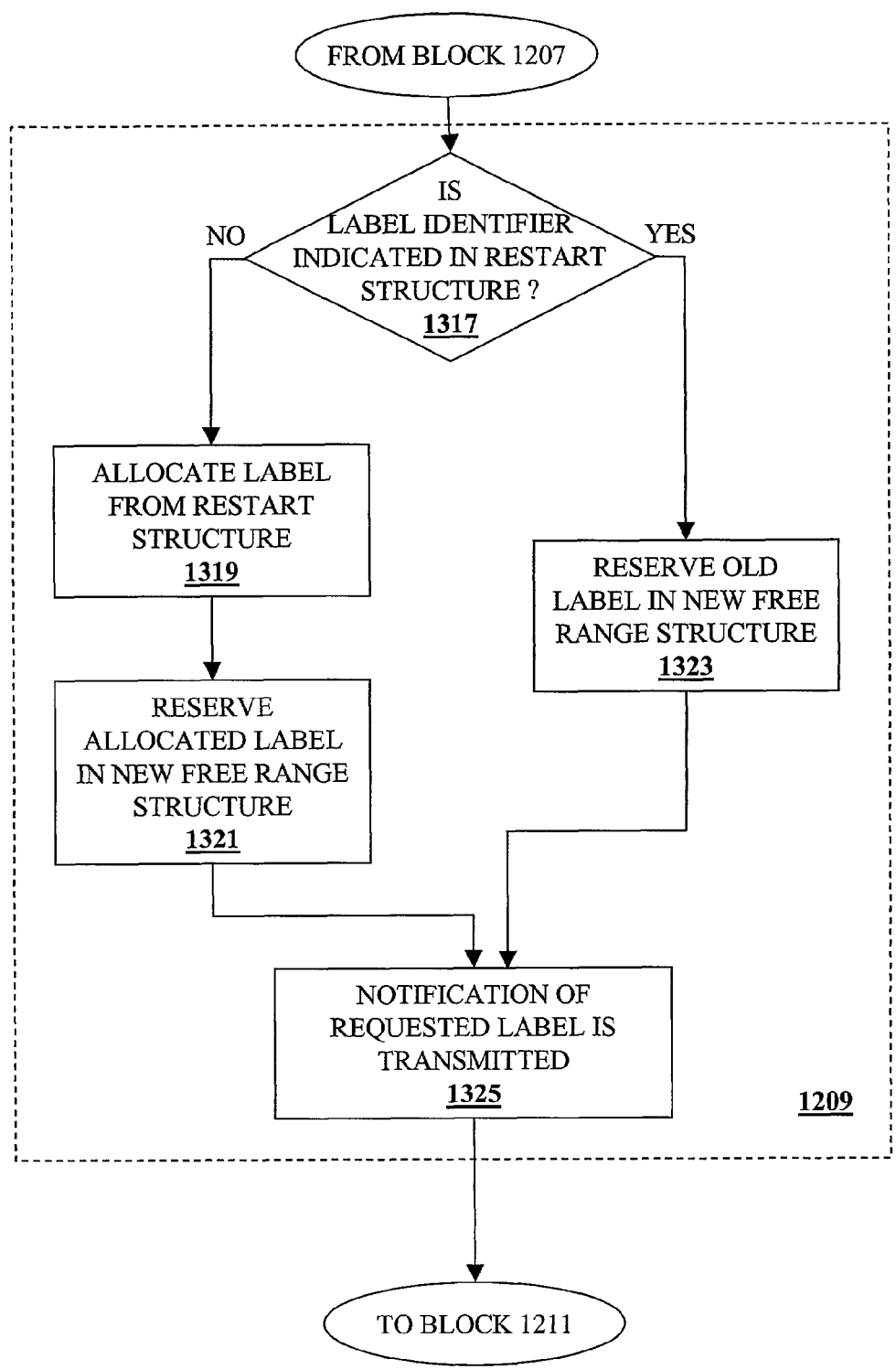
FIG. 13 is an exemplary flow chart for performing block 1209 of FIG. 12 according to one embodiment of the invention.

As previously indicated, the operations described in the flow charts illustrated in FIGS. 10-11 are exemplary. For example, operations described in block 1005 may be performed before the operations described in block 1003. According to one embodiment, the label manager in the control plane performs the operations described in FIGS. 10-11. In alternative embodiments, a different process or module may track allocated labels. FIGS. 12-13 describe operations performed by the restarted clients' label allocation manager.

FIG. 12 is an exemplary flow chart for confirming labels and restoring labels according to one embodiment of the invention. At block 1201, a client restarts. At block 1203, a restart structure is created. At block 1205, a new free-range structure is created. At block 1206, previously allocated labels are received. At block 1207, the received previously allocated labels are indicated in the restart structure. While in one embodiment, the restart structure is a free range structure, different embodiments may use different structures (e.g., a structure that indicates individual labels, a structure that indicates ranges of allocated labels, etc.). In addition, various embodiments may not create a new free range structure at block 1205. Alternative embodiments may create a new structure that indicates ranges of allocated labels, individual labels that have been allocated, etc. At block 1209, previously allocated labels and new labels are processed. At block 1211, it is determined if time has expired. If time has not expired, then control flows back to block 1209. If time has expired, then control flows to block 1213.

At block 1213, the restart structure is deleted. At block 1215, new labels are processed.

Although block 1205 indicates that allocated labels are tracked with a free range structure, various embodiments may track allocated labels with different techniques (e.g., a structure identifying allocated labels).

FIG. 13 is an exemplary flow chart for performing block 1209 of FIG. 12 according to one embodiment of the invention. Block 1317 receives control from block 1207 of FIG. 12. At block 1317, it is determined if the requested label is indicated in the restart structure. If the requested label is indicated in the restart structure, then control flows to block 1323. If the requested label is not indicated in the restart structure, then control flows to block 1319.

At block 1323, the previously allocated label is removed from the ranges of free labels indicated in the new free-range structure. Control flows from block 1323 to block 1325.

At block 1319, the requested label is allocated from the restart structure. At block 1321, the allocated label is restarted in the new free-range structure. At block 1325, notification of the requested label is transmitted to the module maintaining information for allocated labels (e.g., the label manager).

As previously indicated, the operations described in FIG. 13 are exemplary. For example, block 1325 may be performed after a certain number of labels have been confirmed and/or allocated, after the time limit has expired, after a single label has been allocated or confirmed, etc. In addition, different embodiments may perform block 1319 differently, depending on how the restart structure is implemented.

Furthermore, old labels may not be restored in some network devices. If old labels are not restored, the flowcharts illustrated in FIGS. 11-13 will be performed differently. In such an embodiment, blocks 1117 and 1119 of FIG. 11 and blocks 1317 and 1323 of FIG. 13 would not be performed. In addition, block 1209 of FIG. 12 would not process old labels.

Alternative embodiments of the invention may implement centralized label allocation instead of distributed label allocation. In such embodiments, collisions between new and old labels can be avoided with the restart structure. In addition, maintaining stale labels during a certain period of time will still avoid interruption of traffic being forwarded with old labels while the client returns to a consistent state.

As previously stated, partitioning label spaces provides modularity of label allocation which enables restoration of a client's partition to a consistent state after a restart without interrupting traffic forwarding in the data plane. The state of labels remains consistent between neighboring network devices and labels are restored with minimal inter-process communication. In addition, partitioning label spaces in conjunction with allocating labels from free label ranges provides the flexibility to manage the free-range structure for each partition of individual label spaces. Moreover, the increased number of free-range structures to be maintained for label space partitions and/or contexts with multiple label spaces does not impact performance or consume a large amount of memory since the free-range structures are relatively inexpensive data structures. Partitioning label spaces also provides for more efficient structuring of LFIBs for improved look-up of labels.

Label Forwarding Information Bases for Partitioned Label Spaces

According to one embodiment, an LFIB is hierarchically organized by partitions. Forwarding information for each label is sub-indexed by a set of least significant bits of the label, which is indexed by a partition identifier. When all permutations of the least significant bits within a partition are exhausted, forwarding information is further sub-indexed with middle bits of corresponding labels. Alternative embodiments of the invention may utilize the middle bits for sub-indexing before exhausting all permutations of the LSBs that are not outside of a partition (e.g., exhausting permutations of LSBs that are not outside of a partition for each middle bit permutation).

Figure 14:
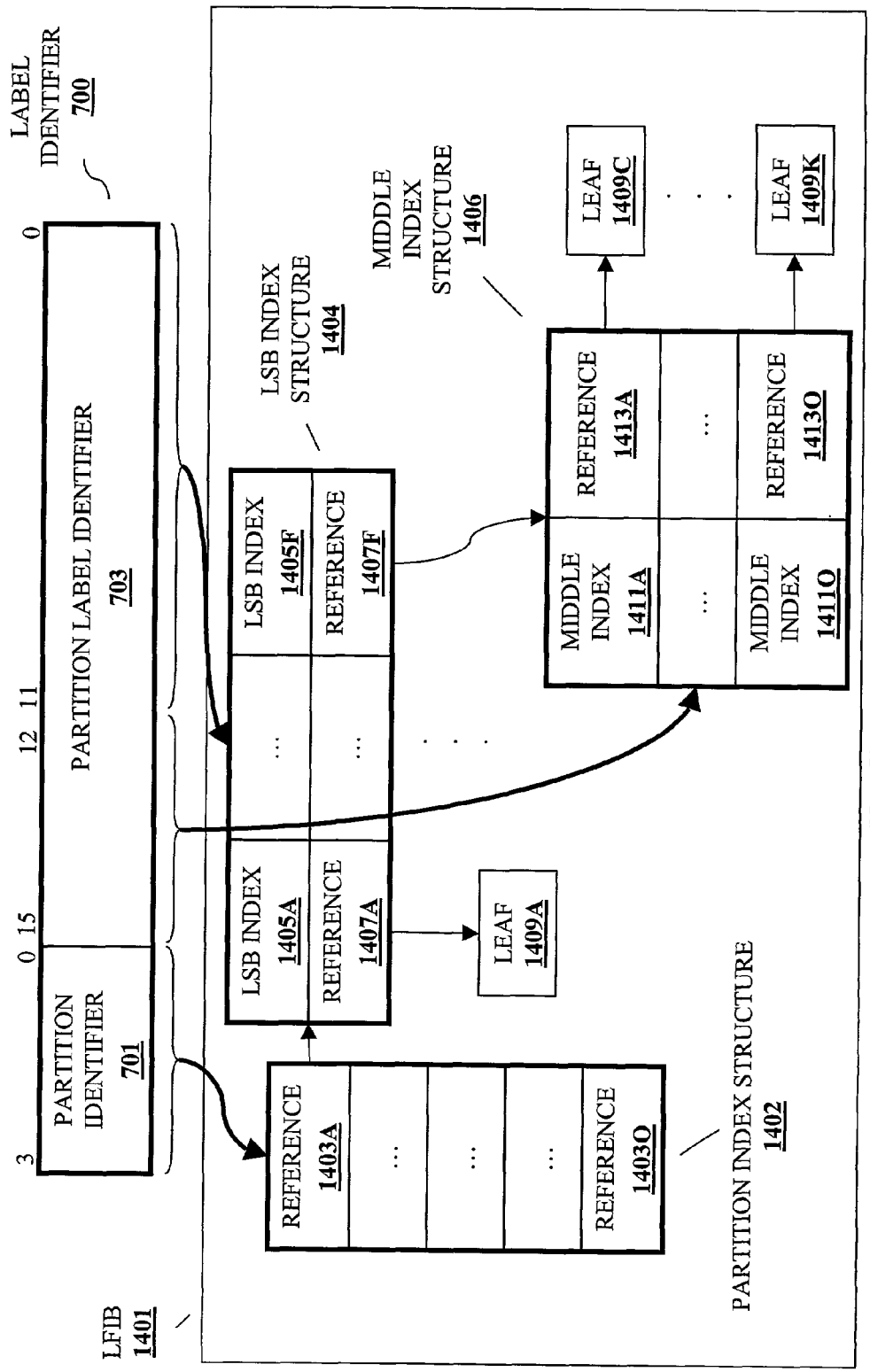
FIG. 14 is an exemplary diagram illustrating a label forwarding information base according to one embodiment of the invention.

FIG. 14 is an exemplary diagram illustrating a label forwarding information base according to one embodiment of the invention. In FIG. 14, an LFIB 1401 includes the following structures: a partition index structure 1402, a least significant bit (LSB) index structure 1404, and a middle index structure 1406. The partition index structure 1402 includes reference fields 1403A-1403O. Each of the reference fields 1403A -1403O corresponds to one of the possible partitions of a label space, which are represented by the 4 most significant bits (MSB) of a label. In FIG. 7A, the 4 MSB, representing the partition identifier of the label 700 are shown as corresponding to the partition index structure. Each of the reference fields 1403A-1403B can store a reference to an LSB index structure. Each of the reference fields 1403A-1403O of the partition index structure 1402 may be statically allocated for each partition of a label space or may be dynamically allocated upon activation of partition. In an alternative embodiment, the partition index structure 1402 includes additional fields to indicate partitions.

In FIG. 14, the reference field 1403A references the LSB index structure 1404. The 12 least significant bits (LSBs) of the label 700 are shown as corresponding to the LSB index structure. The LSB index structure 1404 includes LSB index fields 1405A-1405F and reference fields 1407A-1407F. Each of the LSB index fields 1405A-1405F indicates a value corresponding to the twelve least significant bits of a label. Various embodiments may vary the number of bits indicated in the LSB index field. Each of the reference fields 1407A-1407F references either a leaf (i.e., a data structure with information corresponding to the label) or a middle index structure. A bit in each of the reference fields 1407A-1407F is set to indicate whether a leaf or a middle index structure is being referenced. Alternative embodiments may indicate whether a leaf or middle index structure is referenced differently (e.g., an additional field for a flag to indicate whether the reference is a leaf or middle index structure, separate reference fields, etc.). In FIG. 14, the reference field 1407A of the LSB index structure 1404 references a leaf 1409A. The leaf 1409A includes forwarding information and additional information for the label identified in the LSB index field 1405A.

The reference field 1407F of the LSB index structure 1404 references the middle index structure 1406. The bits between the 12 LSBs and the partition identifier of the label 700 are shown as corresponding to the middle index structure 1406. The middle index structure 1406 includes middle index fields 1411A-1411O and reference fields 1413A-1413O. Each of the middle index fields 1411A-1411O indicates a value corresponding to the 4 bits between the partition identifier and the 12 least significant bits (LSBs) indicated in the LSB index structure. Various embodiments may vary the number of bits corresponding to the middle index fields 1411A-1411O. In one embodiment, the middle index structure 1406 has an element for each of the possible values for the 4 middle bits of a label. In another embodiment, the middle index structure 1406 creates elements as needed. In FIG. 14, the reference field 1413A references a leaf 1409C. The reference field 1413O references a leaf 1409K. The leaf 1709C and the leaf 1409K correspond to a label with the same 12 LSBs. Therefore, the leaf 1409C and the leaf 1409K are distinguished with the third level of indexing utilizing the middle bits of their labels.

Organizing an LFIB with a hierarchy of indices increases the speed of looking up forwarding information corresponding to a label of a packet. In addition, maintenance efficiency of the LFIB is improved.

FIG. 15 is an exemplary diagram illustrating a leaf according one embodiment of the invention. In FIG. 15, a leaf 1501 includes the following 4 fields: a forwarding information field 1503, a label switched path (LSP) field 1505, a forwarding feature field 1507, and a label field 1509. The forwarding information field 1503 indicates forwarding information (e.g., a slot, a port, etc.). The LSP field 1505 indicates an LSP corresponding to the label. The forwarding feature field 1507 indicates one or more forwarding features (e.g., packet counters, quality of service, packet classifications, etc.) associated with the LSP indicated in the LSP field 1505. The label field 1509 indicates part or all of the label. While in some embodiments, the label field 1509 indicates the entire label, in other embodiments the label field 1509 indicates more or less (e.g., the partition label, but not the partition identifier).

Figure 16A:
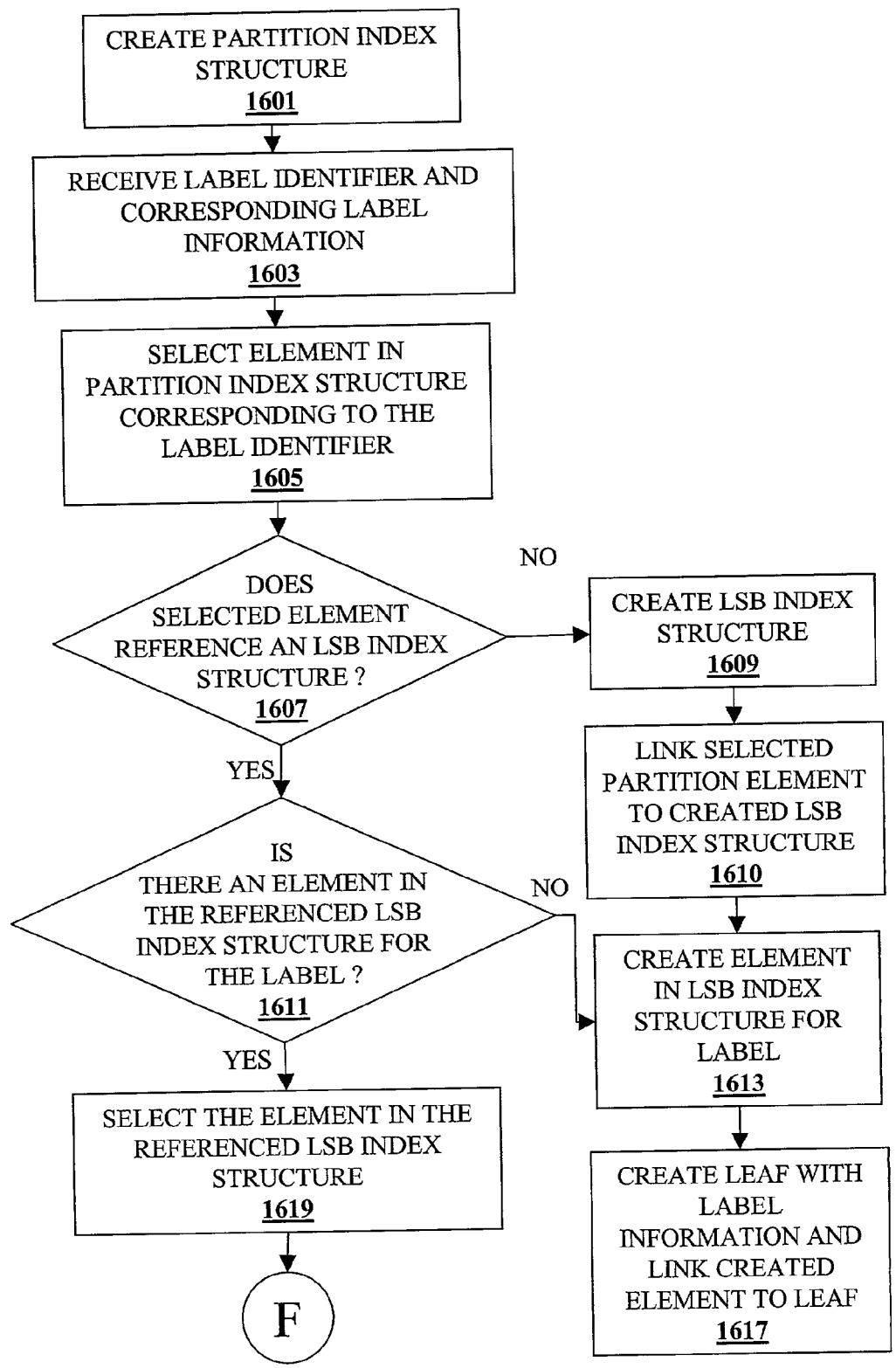
FIG. 16A is an exemplary flowchart for creating a leaf in an LFIB according to one embodiment of the invention.
Figure 16B:
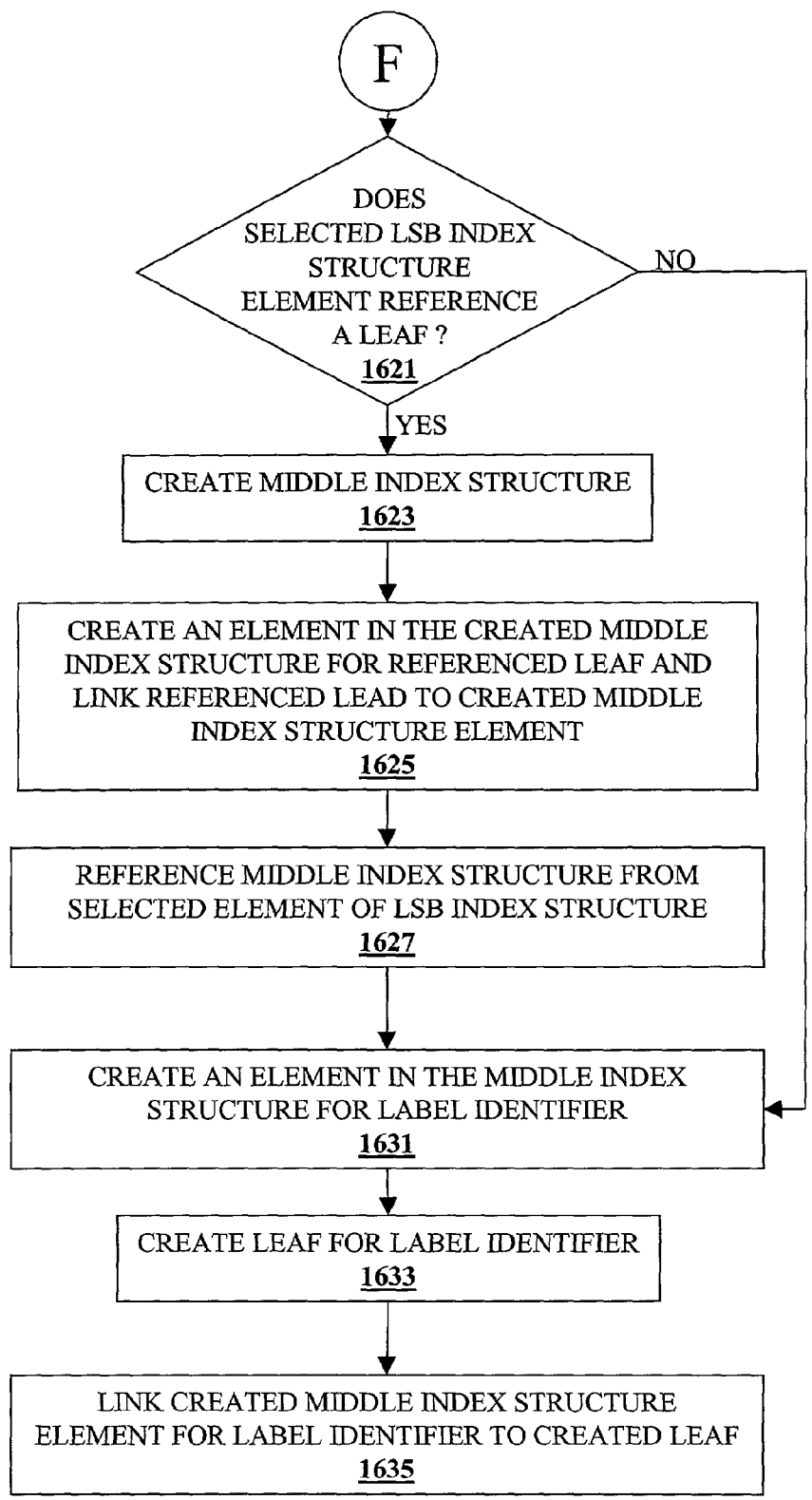
FIG. 16B is an exemplary flow chart continuing from the flow chart of FIG. 16A according to one embodiment of the invention.

FIGS. 16A-16B are exemplary flow charts for creating a leaf in an LFIB according to one embodiment of the invention. FIG. 16A is an exemplary flowchart for creating a leaf in an LFIB according to one embodiment of the invention. At block 1601, a partition index structure is created. At block 1603, a label and corresponding label information are received. At block 1605, an element in the partition index structure corresponding to the partition identifier of the received label is selected. At block 1607, it is determined if the selected element of the partition index structure references an LSB index structure. If the selected element does not reference an LSB index structure, then control flows to block 1609. If the selected element references an LSB index structure, then control flows to 1611.

At block 1609, an LSB index structure is created. At block 1610, the created LSB index structure is linked with the selected partition index element. Control flows from block 1610 to block 1613.

At block 1611, it is determined if there is an element in the referenced LSB index structure for the LSBs of the received label. If the referenced LSB index structure does not include an element for the LSBs for the received label, then control flows to block 1613. If the referenced LSB index structure includes an element for the LSBs of the received label, then control flows to block 1619. Alternative embodiments may allocate the LSB index structure and its elements statically instead of dynamically and determine if an LSB element has been allocated with various techniques (e.g., checking the reference field for a null value).

At block 1613, an LSB index element is created in the LSB index structure for the received label. At block 1617, a leaf with the label information is created and linked with the created LSB index element in the LSB index structure.

At block 1619, the element for the received label in the LSB index structure is selected. Control flows from block 1619 to block 1621.

FIG. 16B is an exemplary flow chart continuing from the flow chart of FIG. 16A according to one embodiment of the invention. Block 1621 receives control from block 1619. At block 1621, it is determined if the selected LSB index element references a leaf. This can be determined in a variety of ways depending upon implementation of the middle index structure. In one embodiment, a bit is set to indicate whether the object being referenced is a leaf or a middle index structure. This bit can be indicated in a separate field in the LSB index structure, in the reference field, etc. Alternative embodiments may implement the LSB index structure two different reference fields for each LSB index, only one of which can be a non-null value once an object is created for the corresponding LSB index. If the selected LSB index element does not reference a leaf, then control flows to block 1631. If the selected LSB index structure element references a leaf, then control flows to block 1623.

At block 1623, a middle index structure is created. At block 1625, an element is created in the created middle index structure for the referenced leaf and the referenced leaf is linked to the created middle index element. At block 1627, the selected LSB index element is linked with the created middle index structure.

At block 1631, a middle index element is created in the middle index structure for the received label. At block 1633, a leaf for the received label is created. At block 1635, the created middle index element for the received label is linked with the leaf created for the received label.

It should be understood that the operations and order of operations illustrated in FIGS. 16A-16C are exemplary (e.g., alternative embodiments may perform certain of the operations in a different order, combine certain of the operations, perform certain of the operations in parallel, etc.). For example, block 1633 may be performed before block 1625. Block 1625 and block 1633 may be performed in parallel. In addition, the operation performed at block 1601 may be performed substantially before the remaining operations.

Figure 17:
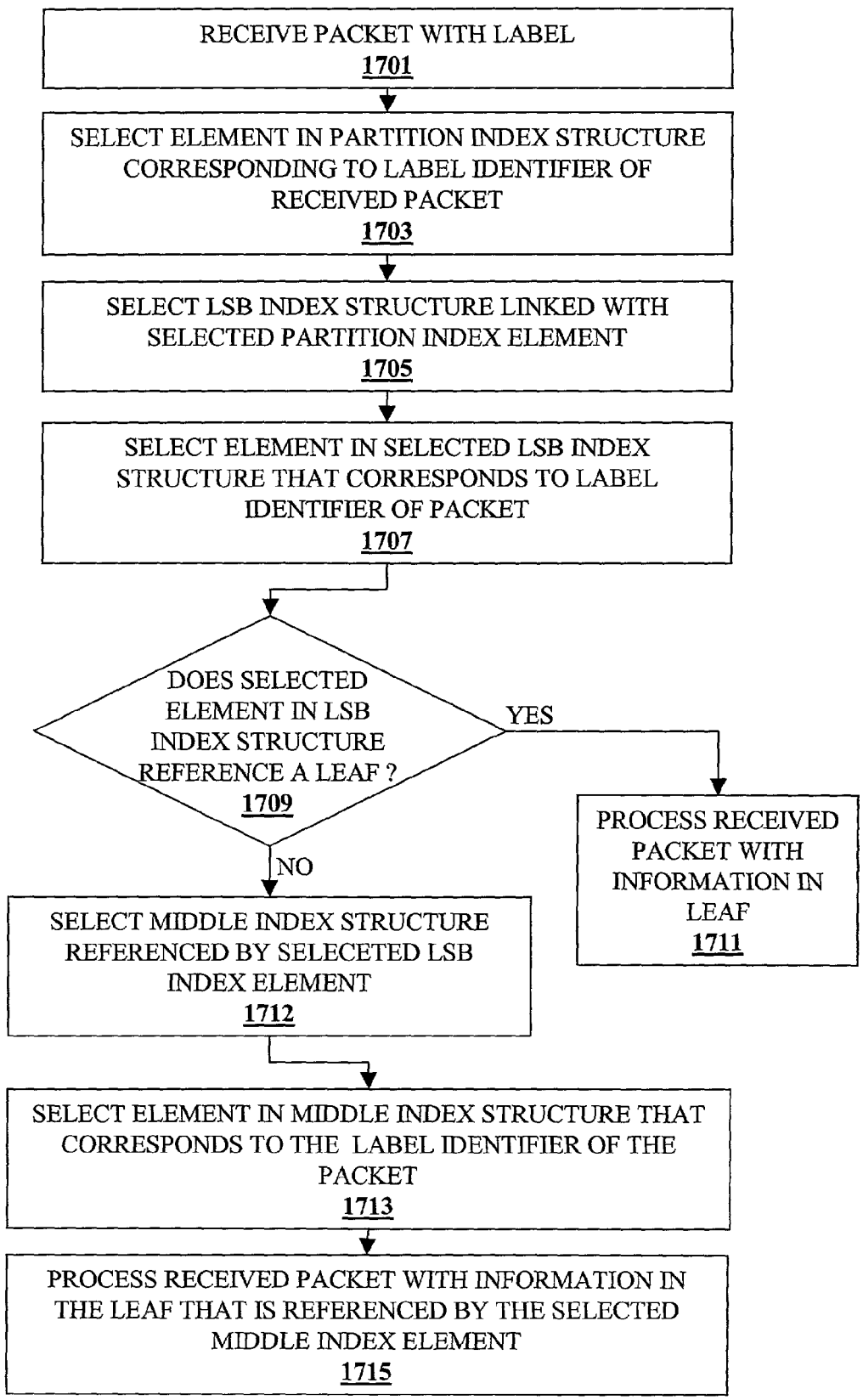
FIG. 17 is an exemplary flow chart for looking up an element in a label forwarding information base according to one embodiment of the invention.

FIG. 17 is an exemplary flow chart for looking up an element in a label forwarding information base according to one embodiment of the invention. At block 1701, a packet with a label is received. At block 1703, an element in the partition index structure corresponding to the label of the received packet is selected. At block 1705, the LSB index structure linked with the selected partition index structure element is selected. At block 1707, an element in the selected LSB index structure that corresponds to the label of the received packet is selected. At block 1709, it is determined if the selected LSB index structure element references a leaf. If the selected LSB index structure element does not reference a leaf, then control flows to block 1712. If the selected LSB index structure element references a leaf, then control flows to block 1711.

At block 1711, the received packet is processed with information in the referenced leaf.

At block 1712, the middle index structure referenced by the selected LSB index element is selected. At block 1713, an element in the middle index that corresponds to the label of the received packet is selected. At block 1715, the received packet is processed with information in the leaf that is referenced by the selected middle index element.

Partitioning label spaces enables the creation of LFIBs that can retrieve forwarding information for a packet traversing an LSP with relatively few look-ups. The LFIB for partitioned label spaces also reduces the amount of memory used because the middle bits may not be indicated in the LFIB, as previously described.

Figure 18:
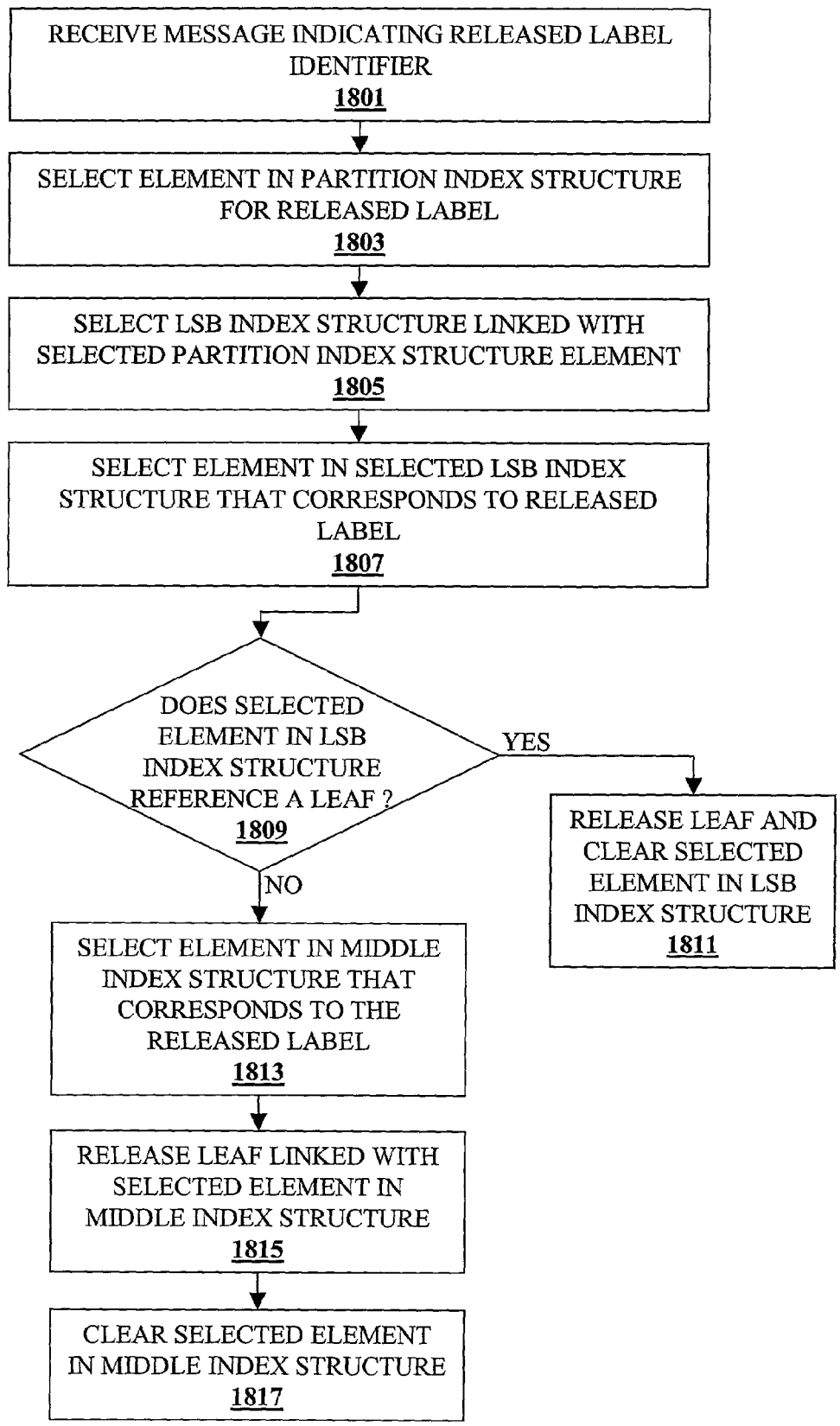
FIG. 18 is an exemplary flow chart for releasing a label from the LFIB according to one embodiment of the invention.

FIG. 18 is an exemplary flow chart for releasing a label from the LFIB according to one embodiment of the invention. At block 1801, a message indicating a released label is received. At block 1803, an element in the partition index structure corresponding to the released label is selected. At block 1805, the LSB index structure linked with the selected partition index element is selected. At block 1807, an element in the selected LSB index structure that corresponds to the released label is selected. At block 1809, it is determined if the selected element in the LSB index structure references a leaf. If the selected element in the LSB index structure references a leaf, then control flows to block 1811. If the selected element in the LSB index structure does not reference a leaf, then control flows to block 1813.

At block 1811, the referenced leaf is released and the selected element in the LSB index structure is cleared. Clearing a selected element in the LSB index structure may comprise one or more operations depending upon implementation of the LSB index structure. In one embodiment, the element is initialized. In another embodiment, the element is deallocated. After deallocation, the LSB index structure may be modified or balanced in relation to the type of data structure.

At block 1813, an element in the middle index structure that corresponds to the released label is selected. At block 1815, the leaf linked with the selected element in the middle index structure is released. At block 1817, the selected element in the middle index structure is cleared. Clearing the selected element in the middle index structure may comprise one or more operations similar to those described with respect to block 1811.

Figure 19:
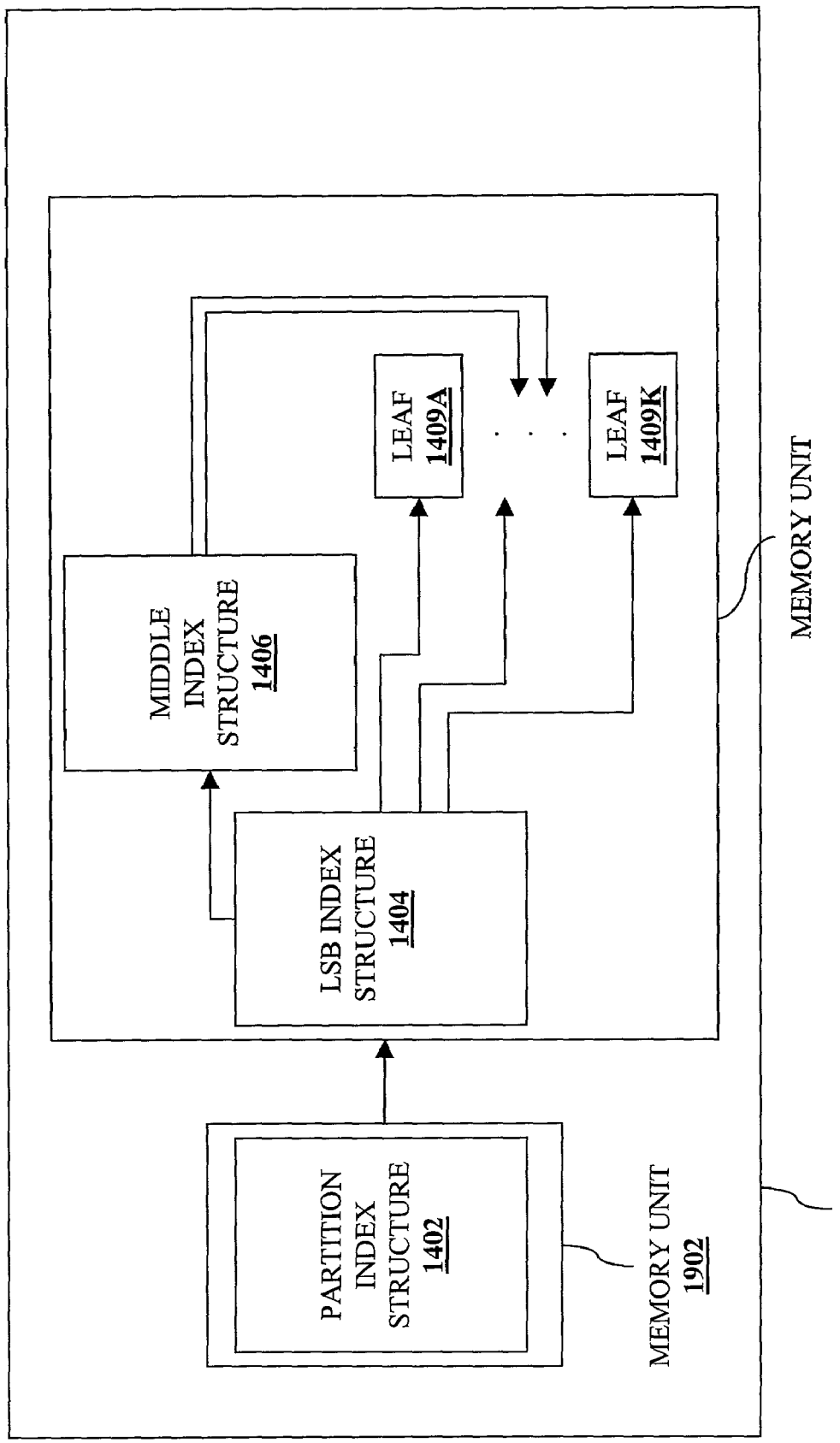
FIG. 19 is an exemplary diagram illustrating a line card with a label forwarding information base according to one embodiment of the invention.

FIG. 19 is an exemplary diagram illustrating a line card with a label forwarding information base according to one embodiment of the invention. In FIG. 19, a line card 1901 includes a memory unit 1902 and a memory unit 1903. The partition index structure 1402 is hosted in the memory unit 1902. The memory unit 1902 is coupled to the memory unit 1903. The memory unit 1903 hosts the LSB index structure 1404, the middle index structure 1406, and the leaves 1409A-1409K.

The memory units illustrated in FIG. 19 may be SRAM, DRAM, CAM, etc. Implementing the LFIB as described in FIG. 14, enables an architecture with a typically more expensive fast memory unit (e.g., SRAM), to host the relatively small partition index structure. One or more other memory units (e.g., DRAM) may store the remaining structures of the LFIB. Partitioning label spaces enables implementation of an architecture that retrieves forwarding information with a single access to less expensive, and typically slower, memory units.

Figure 20:
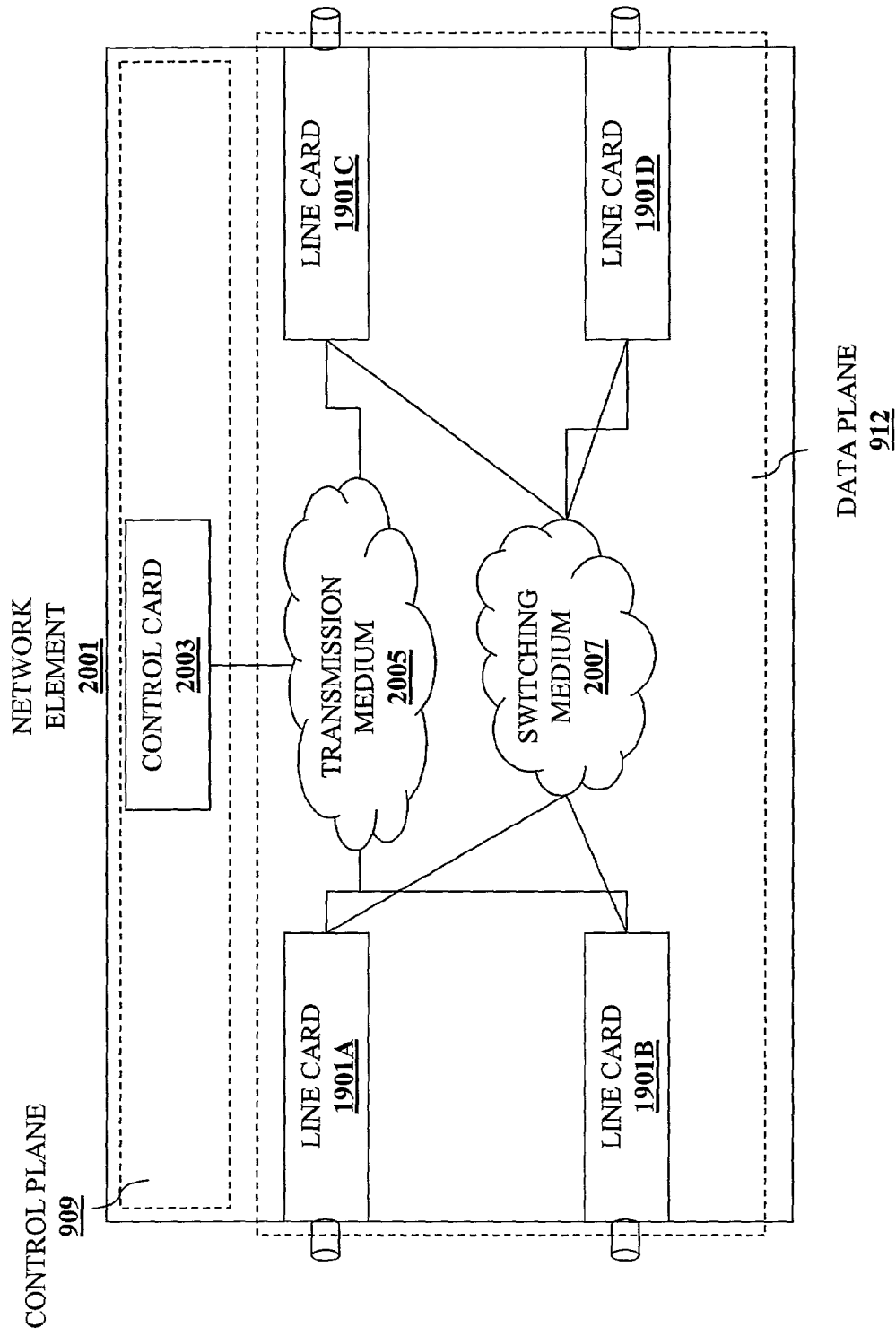
FIG. 20 is a diagram of an exemplary network element according to one embodiment of the invention.

FIG. 20 is a diagram of an exemplary network element according to one embodiment of the invention. In FIG. 20, a network element 2001 includes a control card 2003 in the control plane 909. The control card 2003 is coupled with a transmission medium 2005 (e.g., a system bus) in the data plane 912. The transmission medium 2005 is coupled with the line cards 1901A-1901D. The transmission medium 2005 carries information from the control card 2003 to the line cards 1901A-1901D. One or more of the line cards 1901A-1901D may host one or more LFIBS. The line cards 1901A-1901D are coupled with each other via the switching medium 2007. The switching medium may be a separate switching unit including hardware and/or software to determine which line card to forward traffic. Alternatively, the switching medium may be a mesh of lines interconnecting the line cards 1901A-1901D.

The control card 2003 and line cards 1901A-1901D illustrated in FIG. 20 include memories, processors, and/or ASICs. Such memories include a machine-readable medium on which is stored a set of instructions (i.e., software embodying any one, or all, of the methodologies described herein. Software can reside, completely or at least partially, within this memory and/or within the processor and/or ASICs. For the purposes of this specification, the term "machine-readable medium" shall be taken to include any mechanism that provides (i.e., stores and/or transmits) information in a form readable by a machine (e.g., a computer). For example, a machine-readable storage medium includes read only memory ("ROM"), random access memory ("RAM"), magnetic disk storage media, optical storage media, and flash memory devices. A machine-readable transmission medium includes electrical, optical, acoustical, or other forms of propagated signals (e.g., carrier waves, infrared signals, digital signals, etc.), etc.

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

We claim:

1. A method in a network device comprising:
    logically partitioning a contiguous range of labels within a label space by a computer processor of said network device, wherein the contiguous range of labels is designated for a client and each of the labels from the range of labels is only allocable for use by the client;
    logically partitioning a second contiguous range of labels within the label space by said computer processor of said network device, wherein the second contiguous range of labels is designated for a second client and each of the labels from the second range of labels is only allocable for use by the second client;
    reflecting, in said range, one or more sets of labels allocated and one or more sets of labels unallocated by said client for label switching with peers of said network device through a free range structure that tracks a hierarchy of unallocated sub-ranges within said range; and
    reflecting, in said second range, one or more sets of labels allocated and one or more sets of labels unallocated by said second client for label switching with the peers of said network device through a second free range structure that tracks a hierarchy of unallocated sub-ranges within said second range.

2. The method of claim 1 wherein reflecting in said one or more sets of labels allocated and one or more sets labels unallocated by said client range comprises excluding labels that have been allocated from said one or more sets of labels unallocated by said client.

3. The method of claim 1 further comprising:
    releasing a set of one or more labels from the partition from being allocated; and
    reflecting in said one or more sets of unallocated labels those labels released from the partition by modifying said one or more sets of unallocated labels to include the released set of labels.

4. The method of claim 1 wherein reflecting in said sets of labels allocated and one or more sets labels unallocated by said client comprises including labels in said sets of labels allocated that have been allocated.

5. The method of claim 1 further comprising:
    releasing a set of one or more labels from the partition from being allocated; and
    reflecting in said sets of labels allocated, the released labels by modifying said sets of labels allocated to exclude the released set of labels.

6. The method of claim 1 wherein allocating the labels is in response to receiving a label request that indicates a range of acceptable labels.

7. The method of claim 1 wherein the set of ranges are maintained within a splay tree.

8. A method in a network device comprising:
    receiving a request from a first of a plurality of clients for an available label within a label space, wherein each of said plurality of clients has been designated a different, mutually exclusive partition of said label space;
    selecting a currently unallocated label in accordance with a set of label ranges that reflect labels currently allocable for label switching within the partition of the label space designated for the first of the plurality of clients; and
    modifying the set of label ranges to reflect allocation of the selected label by updating a free range structure that tracks a hierarchy of unallocated sub-ranges within a partition.

9. The method of claim 8 wherein the set of label ranges are ranges of currently unallocated labels.

10. The method of claim 9 wherein modifying the set of label ranges comprises modifying the ranges to exclude the selected label from being currently allocable.

11. The method of claim 9 further comprising:
    releasing a set of one or more labels currently allocated from the partition of labels designated for the first of the plurality of clients; and
    modifying the set of label ranges to include the set of released labels as being currently allocable.

12. The method of claim 8 wherein the set of label ranges are ranges of currently allocated labels.

13. The method of claim 12 wherein modifying the set of label ranges comprises modifying the set of label ranges to include the selected label as being currently allocated.

14. The method of claim 12 further comprising:
releasing a set of allocated labels currently allocated from the partition of labels designated for the first of the plurality of clients; and
modifying the set of abel ranges to exclude the released labels as being currently allocable.

15. The method of claim 8 wherein the request indicates a range of acceptable labels.

16. The method of claim 15 wherein the range of acceptable labels is within the partition of the label space designated for the first client.

17. The method of claim 8 I wherein said free range structure is a splay tree.

18. A network device comprising:
a set of one or more control cards to host a set of one or more client protocol modules and to maintain a set of one or more trees of one or more ranges, the set of trees to reflect labels allocated in response to label requests from said set of clients, the labels for label switching with peers of the network device, the set of control cards to exclusively designate different ones of a plurality of partitions of a label space to different ones of each of the clients, wherein each of the set of trees reflects labels allocated from different ones of the plurality of partitions, wherein each of the set of trees references a free range structure that tracks a hierarchy of unallocated sub-ranges within a respective partition of the label space; and
a set of one or more line cards coupled with the set of control cards to receive forwarding information associated with said labels, the set of line cards to forward packets in accordance with the forwarding information.

19. The network device of claim 18 further comprising a switching medium coupling together the set of line cards.

20. The network device of claim 18 wherein the tree is a splay tree.

21. The network device of claim 18 further comprising the set of control cards to host a set of one or more routing protocol modules.

22. The network device of claim 18 wherein the set of clients include a set of one or more signaling protocol modules and/or a static label switched path module.

23. An apparatus comprising:
a processor; and
a memory to store a tree data structure including,
a first field to indicate a beginning label of a range of contiguous labels within a label space, the labels for label switching with peers of the network device and the range reflecting labels that have been allocated but not released;
a second field to indicate an ending label of the range of contiguous labels within the label space, the range of contiguous labels is only allocable for use by a first client and another range of contiguous labels within the label space is only allocable for use by a second client; and
a third field to reference a free range structure that tracks a hierarchy of unallocated sub-ranges within the range of contiguous labels.

24. The apparatus of claim 23 wherein the tree data structure is splay tree.

25. The apparatus of claim 23 wherein the labels within the range are allocated labels.

26. The apparatus of claim 25 wherein the beginning label and the ending label are unallocated labels.

27. The apparatus of claim 23 wherein the labels within the range are unallocated labels.

28. The apparatus of claim 27 wherein the beginning label and the ending label are allocated labels.

29. The apparatus of claim 23 wherein the data structure further comprises a third field to indicate a sub-space of the label space.

30. A non-transitory machine-readable storage medium that provides instructions, which when executed by a set of one or more processors, cause said set of processors to perform operations comprising:
receiving a request from a first of a plurality of clients for an available label within a label space, wherein each of said plurality of clients has been designated a different, mutually exclusive partition of said label space;
selecting a currently unallocated label in accordance with a set of label ranges that reflect labels currently allocable for label switching within the partition of the label space designated for the first of the plurality of clients; and
modifying the set of label ranges to reflect allocation of the selected label by updating a free range structure that tracks a hierarchy of unallocated sub-ranges within a partition.

31. The non-transitory machine-readable storage medium of claim 30 wherein the set of label ranges are ranges of currently unallocated labels.

32. The non-transitory machine-readable storage medium of claim 31 modifying the set of label ranges comprises modifying the ranges to exclude the selected label from being currently allocable.

33. The non-transitory machine-readable storage medium of claim 31 further comprising:
releasing a set of one or more labels currently allocated from the partition of labels designated for the first of the plurality of clients; and
modifying the set of label ranges to include the set of released labels as being currently allocable.

34. The non-transitory machine-readable storage medium of claim 30 wherein the set of label ranges are ranges of currently allocated labels.

35. The non-transitory machine-readable storage medium of claim 34 wherein modifying the set of label ranges comprises modifying the set of label ranges to include the selected label as being currently allocated.

36. The non-transitory machine-readable storage medium of claim 34 further comprising:
releasing a set of allocated labels currently allocated from the partition of labels designated for the first of the plurality of clients; and
modifying the set of label ranges to exclude the released labels as being currently allocable.

37. The non-transitory machine-readable storage medium of claim 30 wherein the request indicates a range of acceptable labels.

38. The non-transitory machine-readable storage medium of claim 37 wherein the range of acceptable labels is within the partition of the label space designated for the first client.

39. The non -transitory machine-readable storage medium of claim 30 wherein the free range structure is a splay tree.

40. A non-transitory machine-readable storage medium that provides instructions, which when executed by a set of one or more processors of a network device, cause said set of processors to perform operations comprising:
receiving a label request indicating a request range, the request range indicating a range of acceptable labels;
selecting a set of one or more currently unallocated labels within the request range in accordance with the set of one or more label ranges that reflect labels currently allocated for label switching with peers of the network device, wherein the set of one or more label ranges are included in a designated, mutually exclusive partition of a label space attributable to a client and is separate from a different set of one or more label ranges of the label space attributable to a different client; and modifying the set of label ranges to reflect allocation of the selected set of labels by updating a free range structure that tracks a hierarchy of unallocated sub-ranges within a partition.

41. The non-transitory machine-readable storage medium of claim 40 wherein the set of label ranges are ranges of currently unallocated labels.

42. The non-transitory machine-readable storage medium of claim 41 wherein modifying the set of label ranges comprises modifying the set of label ranges to exclude the set of allocated labels.

43. The non-transitory machine-readable storage medium of claim 41 further comprising:
    releasing a set of allocated labels; and
    modifying the set of label ranges to exclude the released labels.

44. The non-transitory machine-readable storage medium of claim 40 wherein the set of label ranges reflect currently allocated labels.

45. The non-transitory machine-readable storage medium of claim 44 wherein modifying the set of label ranges comprises modifying the set of label ranges to include the set of allocated labels.

46. The non-transitory machine-readable storage medium of claim 44 further comprising:
    releasing a set of one or more allocated labels; and
    modifying the set of label ranges to exclude the set of released labels.

47. The non-transitory machine-readable storage medium of claim 40 wherein the set of label ranges and request range are within a first of a plurality of partitions of a label space, the first partition having been designated for one of a plurality clients.

48. The non-transitory machine-readable storage medium of claim 40 wherein the request range is within a first of a plurality of partitions of a label space, the first partition having been designated for one of a plurality of clients.

49. The non-transitory machine-readable storage medium of claim 40 wherein the free range structure is a splay tree.

50. The non-transitory machine-readable storage medium that provides instructions, which when executed by a set of one or more processors, cause said set of processors to perform operation comprising:
    different ones of a plurality of clients generating requests for labels, wherein each of said plurality of clients has been designated a different, mutually exclusive partition of a label space, and wherein each of said request identifies a range of labels that are not outside the partition of the one of the plurality of clients that generated the request;
    responsive to each of said requests, providing a currently unallocated label in accordance with a set of one or more label ranges that reflect labels currently allocable for label switching within the partition of the one of the plurality of clients that generated the request; and
    modifying the set of label ranges to reflect allocation of the provided label by updating a free range structure that tracks a hierarchy of unallocated sub-ranges within a partition.

51. The non-transitory machine-readable storage medium of claim 50 wherein the set of label ranges are label ranges of currently unallocated labels.

52. The non-transitory machine-readable storage medium of claim 51 further comprising:
    releasing a second set of one or more allocated labels; and
    modifying the set of label ranges to include the set of released labels.

53. The non-transitory machine-readable storage medium of claim 50 wherein the set of label ranges are ranges of allocated labels.

54. The non-transitory machine-readable storage medium of claim 53 further comprising:
    releasing a second set of one or more allocated labels; and
    modifying the set of label ranges to include the set of released labels.

55. The non-transitory machine-readable storage medium of claim 50 wherein the free range structure is in a splay tree.

56. A method in a network device comprising:
    partitioning a label space into a plurality of partitions, wherein each client of a plurality of clients of the network device is designated a different, mutually exclusive partition, the partition to include one or more sets of ranges of allocated labels and one or more sets of ranges of unallocated labels by updating a free range structure that tracks a hierarchy of unallocated sub-ranges within a partition;
    allocating labels by a computer processor of said network device for a client from the set of a set of one or more unallocated labels; and
    excluding the labels allocated for label switching with peers of said network device from the one or more set of ranges of unallocated labels and including the allocated labels into the set of one or more allocated labels.

* * * * *

UNITED STATES PATENT AND TRADEMARK OFFICE
CERTIFICATE OF CORRECTION

PATENT NO. : 8,014,395 B1  Page 1 of 1
APPLICATION NO. : 10/103207
DATED : September 6, 2011
INVENTOR(S) : Aggarwal et al.

It is certified that error appears in the above-identified patent and that said Letters Patent is hereby corrected as shown below:

In Drawings

In Fig. 7C, Sheet 12 of 26, delete " 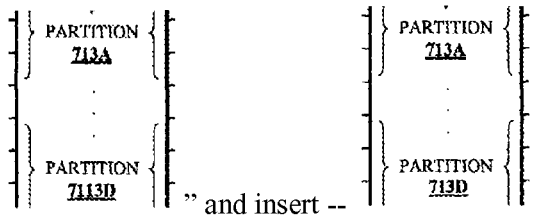 ", therefor.

In Fig. 7C, Sheet 12 of 26, delete "  ", therefor.

In Fig. 17, Sheet 23 of 26, in Box "1712", in Line 2, delete "SELECETED" and insert -- SELECTED --, therefor.

In Column 19, Line 5, in Claim 14, delete "abel" and insert -- label --, therefor.

In Column 19, Line 12, in Claim 17, delete "8 I" and insert -- 8 --, therefor.

Signed and Sealed this
Seventh Day of February, 2012

David J. Kappos
*Director of the United States Patent and Trademark Office*